(12) United States Patent
Hayashi et al.

(10) Patent No.: US 12,008,196 B2
(45) Date of Patent: Jun. 11, 2024

(54) INPUT DETECTION SYSTEM AND DETECTION DEVICE THAT DETECT EXTERNAL RESONANT INPUT SUPPORT DEVICES AND TOUCH

(71) Applicant: Japan Display Inc., Tokyo (JP)

(72) Inventors: Makoto Hayashi, Tokyo (JP); Yuto Kakinoki, Tokyo (JP); Takaaki Kono, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 17/838,685

(22) Filed: Jun. 13, 2022

(65) Prior Publication Data

US 2022/0397999 A1 Dec. 15, 2022

(30) Foreign Application Priority Data

Jun. 15, 2021 (JP) ................................. 2021-099713

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0446* (2019.05)

(58) Field of Classification Search
CPC .. G06F 3/04166; G06F 3/0412; G06F 3/0446; G06F 3/0383; G06F 3/0393
See application file for complete search history.

(56) References Cited

U.S. PATENT DOCUMENTS

| 11,269,441 | B2* | 3/2022 | Kim | G06F 3/0416 |
| 2015/0084899 | A1* | 3/2015 | Park | G06F 3/041 345/173 |
| 2017/0192591 | A1* | 7/2017 | Jang | G06F 3/04166 |
| 2020/0301547 | A1 | 9/2020 | Mori et al. | |
| 2021/0089147 | A1* | 3/2021 | Kim | G06F 3/03545 |
| 2021/0232269 | A1 | 7/2021 | Sasaki et al. | |
| 2022/0066597 | A1* | 3/2022 | Kakinoki | G06F 3/0393 |

FOREIGN PATENT DOCUMENTS

| JP | 6342105 A | 6/2018 |
| JP | 6532631 A | 6/2019 |

* cited by examiner

*Primary Examiner* — Liliana Cerullo
(74) *Attorney, Agent, or Firm* — K&L Gates LLP

(57) ABSTRACT

An input detection system includes a display device with a detection function including a plurality of pixels, a plurality of drive electrodes, and a plurality of detection electrodes arrayed in a display region, an input device including an LC circuit, a first electrode coupled to one end side of the LC circuit, and a second electrode coupled to the other end side of the LC circuit, and a drive electrode scan circuit configured to supply a drive signal to the drive electrodes.

9 Claims, 21 Drawing Sheets

INPUT DETECTION SYSTEM AND DETECTION DEVICE THAT DETECT EXTERNAL RESONANT INPUT SUPPORT DEVICES AND TOUCH

CROSS-REFERENCE TO RELATED APPLICATION

This application claims the benefit of priority from Japanese Patent Application No. 2021-099713 filed on Jun. 15, 2021, the entire contents of which are incorporated herein by reference.

BACKGROUND

1. Technical Field

The present invention relates to an input detection system and a detection device.

2. Description of the Related Art

Japanese Patent Nos. 6342105 and 6532631 describe an input support device (referred to as an operation knob or a knob in Japanese Patent Nos. 6342105 and 6532631) that is placed on a touch panel configured to detect change in electrostatic capacitance or change in a contact region and supports input operations through the touch panel. As a method for detecting the input support device, a method with which the input support device is detected using resonance of a resonance circuit provided in the input support device has been known.

An input support device and an input detection system of a resonance system that use resonance require a predetermined period before a detection value is increased and becomes stable by resonance. In the input detection system, when a detection period of the input support device is set to coincide with a touch detection period of a detection target such as a finger that does not generate resonance, for example, a detection value may therefore be small to lower detection sensitivity.

An object of the present invention is to provide an input detection system and a detection device capable of improving detection sensitivity.

SUMMARY

An input detection system according to an embodiment of the present disclosure includes a display device with a detection function including a plurality of pixels, a plurality of drive electrodes, and a plurality of detection electrodes arrayed in a display region, an input device including an LC circuit, a first electrode coupled to one end side of the LC circuit, and a second electrode coupled to the other end side of the LC circuit, and a drive electrode scan circuit configured to supply a drive signal to the drive electrodes. The display device with the detection function executes a plurality of first display periods, a plurality of first detection periods, a plurality of second display periods, and a plurality of second detection periods in a time division manner, first drive periods that correspond to the first detection periods and in which the drive electrode scan circuit supplies the drive signal to the drive electrodes and second drive periods that correspond to the second detection periods and in which the drive electrode scan circuit supplies the drive signal to the drive electrodes are provided, and the first drive periods are longer than the second drive periods.

A detection device according to an embodiment in which an input device including an LC circuit and a first electrode and a second electrode coupled to the LC circuit is arranged in a detection region is disclosed. The detection device includes a plurality of drive electrodes and a plurality of detection electrodes arrayed in the detection region, and a drive electrode scan circuit configured to supply a drive signal to the drive electrodes. A plurality of first detection periods and a plurality of second detection periods are executed in a time division manner, first drive periods that correspond to the first detection periods and in which the drive electrode scan circuit supplies the drive signal to the drive electrodes and second drive periods that correspond to the second detection periods and in which the drive electrode scan circuit supplies the drive signal to the drive electrodes are provided, and the first drive periods are longer than the second drive periods.

DETAILED DESCRIPTION

Figure 1:
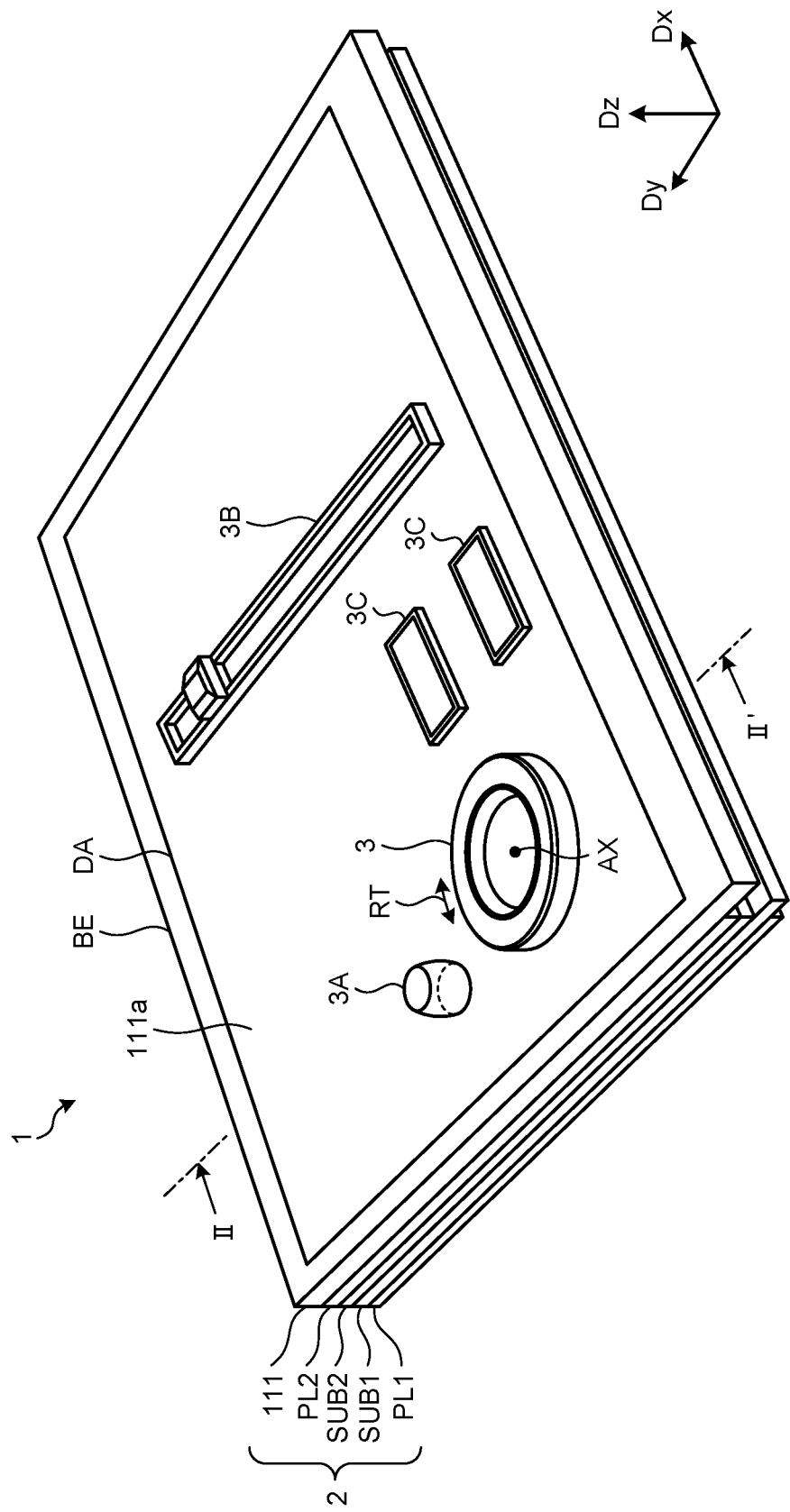
FIG. 1 is a perspective view schematically illustrating an input detection system according to a first embodiment.

Aspects for carrying out the present invention (embodiments) will be described in detail with reference to the drawings. Contents described in the following embodiments do not limit the present disclosure.

Components described below include those that can be easily assumed by those skilled in the art and substantially the same components. Furthermore, the components described below can be appropriately combined. What is disclosed herein is merely an example, and appropriate modifications within the gist of the disclosure of which those skilled in the art can easily think are naturally encompassed in the scope of the present disclosure. In the drawings, widths, thicknesses, shapes, and the like of the components can be schematically illustrated in comparison with actual aspects for more clear explanation. They are however merely examples and do not limit interpretation of the present disclosure. In the present disclosure and the drawings, the same reference numerals denote components similar to those described before with reference to the drawing that has been already referred, and detail explanation thereof can be appropriately omitted.

In the present specification and the scope of the invention, when representing an aspect in which one structure is arranged above another structure, simple expression "above" includes both of the case in which the one structure is arranged directly on the other structure and the case in which the one structure is arranged above the other structure with yet another structure interposed therebetween unless otherwise specified.

First Embodiment

Figure 2:
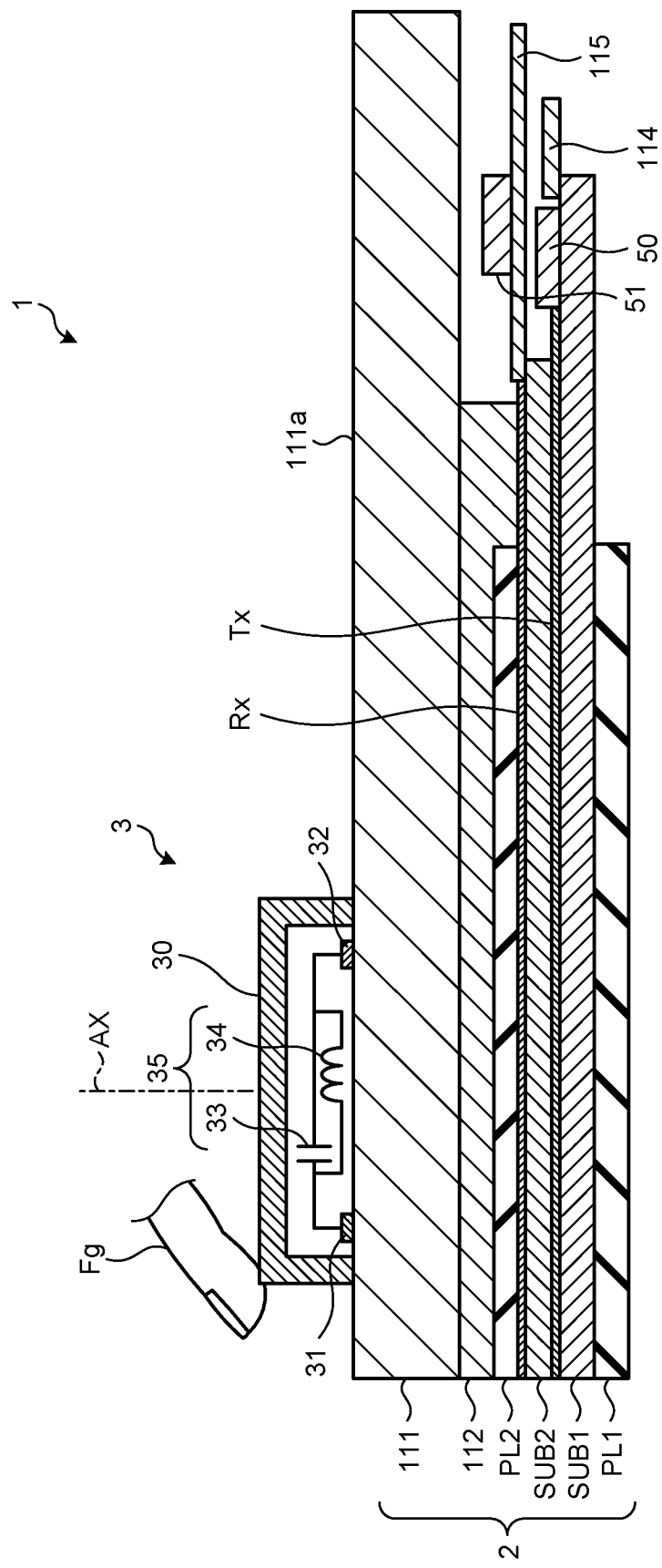
FIG. 2 is a cross-sectional view cut along line II-II' in FIG. 1.

FIG. 1 is a perspective view schematically illustrating an input detection system according to a first embodiment. FIG. 2 is a cross-sectional view cut along line II-II' in FIG. 1. As illustrated in FIG. 1 and FIG. 2, an input detection system 1 includes a display device 2 and an input support device (input device) 3.

One direction of a plane (upper surface 111a) of the display device 2 is a first direction Dx, and a direction orthogonal to the first direction Dx is a second direction Dy. The second direction Dy is not limited to be orthogonal to the first direction Dx and may intersect with the first direction Dx at an angle other than 90°. A third direction Dz orthogonal to the first direction Dx and the second direction Dy corresponds to the thickness direction of an array substrate SUB1.

The display device 2 is, for example, a liquid crystal display (LCD). The display device 2 is however not limited thereto and may be, for example, an organic electro-luminescence (EL) display panel (organic light emitting diode (OLED)) or an inorganic EL display (a micro LED or a mini LED). Alternatively, the display device 2 may be an electrophoretic display (EPD) that uses electrophoretic elements as display elements.

The display device 2 is a display device with a detection function that includes drive electrodes Tx and detection electrodes Rx (refer to FIG. 3) and has functions as a mutual electrostatic capacitance-type touch panel (detection device). In the present embodiment, some of the electrodes and wiring of the display device 2 are shared by electrodes (drive electrodes Tx) and wiring of the touch panel (detection device).

As illustrated in FIG. 1, the display device 2 includes the array substrate SUB1, a counter substrate SUB2, a first polarizing plate PL1, a second polarizing plate PL2, a cover member 111, and an adhesive layer 112 (refer to FIG. 2). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The drive electrodes Tx are provided above the array substrate SUB1. The array substrate SUB1 includes transistors and various wiring lines such as scan lines GL and pixel signal lines SL (refer to FIG. 3) provided on the first substrate 10. The counter substrate SUB2 is provided so as to face the array substrate SUB1. A liquid crystal layer as a display function layer is provided between the array substrate SUB1 and the counter substrate SUB2. The detection electrodes Rx are provided above the counter substrate SUB2.

As illustrated in FIG. 1, a peripheral region BE is provided on the outer side of a display region DA in the display device 2. The display region DA is formed to have a square shape but the outer shape of the display region DA is not limited thereto. For example, the display region DA may have a substantially square shape with curved corners or may have a cutout. Alternatively, the display region DA may have another polygonal shape or another shape such as a circular shape and an elliptic shape.

The display region DA is a region for displaying an image and is a region in which the pixels PX (refer to FIG. 3) are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

As illustrated in FIG. 2, a display integrated circuit (IC) 50 and a wiring substrate 114 are coupled to a protruding portion of the array substrate SUB1. The display IC 50 includes a control circuit that controls display of the display device 2 and touch detection. The display IC 50 is not limited to this example and may be mounted on the wiring substrate 114. Arrangement of the display IC 50 is not limited thereto, and the display IC 50 may be provided on a control substrate or a flexible substrate outside the module, for example.

A wiring substrate 115 is coupled to the counter substrate SUB2. A detection IC 51 is mounted on the wiring substrate 115. The detection IC 51 includes a detection circuit 76 (refer to FIG. 6) and receives supply of detection signals Vdet from the detection electrodes Rx. The detection IC 51 can detect a detection target such as the input support device 3 and a finger Fg based on the detection signals Vdet. Arrangement of the detection IC 51 is not limited thereto, and the detection IC 51 may be provided on a control substrate or a flexible substrate outside the module, for example.

Each of the wiring substrate 114 and the wiring substrate 115 is configured by, for example, flexible printed circuits (FPC).

In the present specification, when the display IC 50 and the detection IC 51 need not to be distinguished from each other for explanation, they can be referred to as a control circuit simply. Some of the circuits and functions included in the display IC 50 may be provided in the detection IC 51, or some of the circuits and functions included in the detection IC 51 may be provided in the display IC 50. The control circuit may include circuit elements and wiring formed separately from the display IC 50 and the detection IC 51, for example, circuit elements and wiring formed on the array substrate SUB1.

As illustrated in FIG. 1 and FIG. 2, the input support device 3 is arranged (mounted) on the upper surface 111a of the cover member 111 for use. A user can perform an input operation on the display device 2 by operating the input support device 3 arranged above the display region DA of the display device 2. The input support device 3 is, for example, a rotary knob and has a circular shape in a plan view when seen from the upper surface 111a of the display device 2. The display device 2 can detect a position of the input support device 3 in a plane and a rotation operation RT centered on a rotating axis AX. That is to say, in the present embodiment, the display region DA is a region in which the drive electrodes Tx and the detection electrodes Rx (refer to FIG. 3) are provided and serves also as a detection region.

As illustrated in FIG. 2, the input support device 3 includes a housing 30, a first electrode 31, a second electrode 32, and an LC circuit 35. In the input support device 3, the LC circuit 35 rotates around the rotating axis AX with an operation by the user. The housing 30 is formed by, for example, a conductor made of a metal material and is a hollow member having a space therein. The housing 30 is not limited to be made of the metal material and may be made of a resin material. Alternatively, the housing 30 may be formed by providing the resin material so as to cover the surface of the metal material.

The first electrode 31, the second electrode 32, and the LC circuit 35 are provided in the housing 30. The LC circuit 35 configures an LC resonance circuit in which a capacitor 33 and an inductor 34 are coupled in parallel with each other. The first electrode 31 is coupled to one end side of the LC circuit 35 (coupling portion N1 (refer to FIG. 4) of the capacitor 33 and the inductor 34 on one end side). The second electrode 32 is coupled to the other end side of the LC circuit 35 (coupling portion N2 (refer to FIG. 4) of the capacitor 33 and the inductor 34 on the other end side). The display device 2 can detect positions of the first electrode 31 and the second electrode 32 using LC resonance of the LC circuit 35.

FIG. 1 illustrates a plurality of input support devices 3A, 3B, and 3C as other examples of the input support device 3. The input support device 3A is a rotary knob and is formed into a tab shape having a planar shape (radius) smaller than that of the input support device 3. The input support device 3B is a slider, and an input operation can be performed by displacement of a tab thereof in a plane. The input support device 3B has a bar-like shape in a plan view. The input support device 3C is a button or an input key, and an input operation can be performed by touching the input support device 3C or performing a press-in operation thereon. The input detection system 1 is not limited to have the configuration in which all of the input support devices 3, 3A, 3B, and 3C are mounted, and it is sufficient that at least equal to or more than one of the input support devices 3, 3A, 3B, and 3C is provided. Hereinafter, the input support device 3 is described. Explanation of the input support device 3 can be applied also to the other input support devices 3A, 3B, and 3C.

Figure 3:
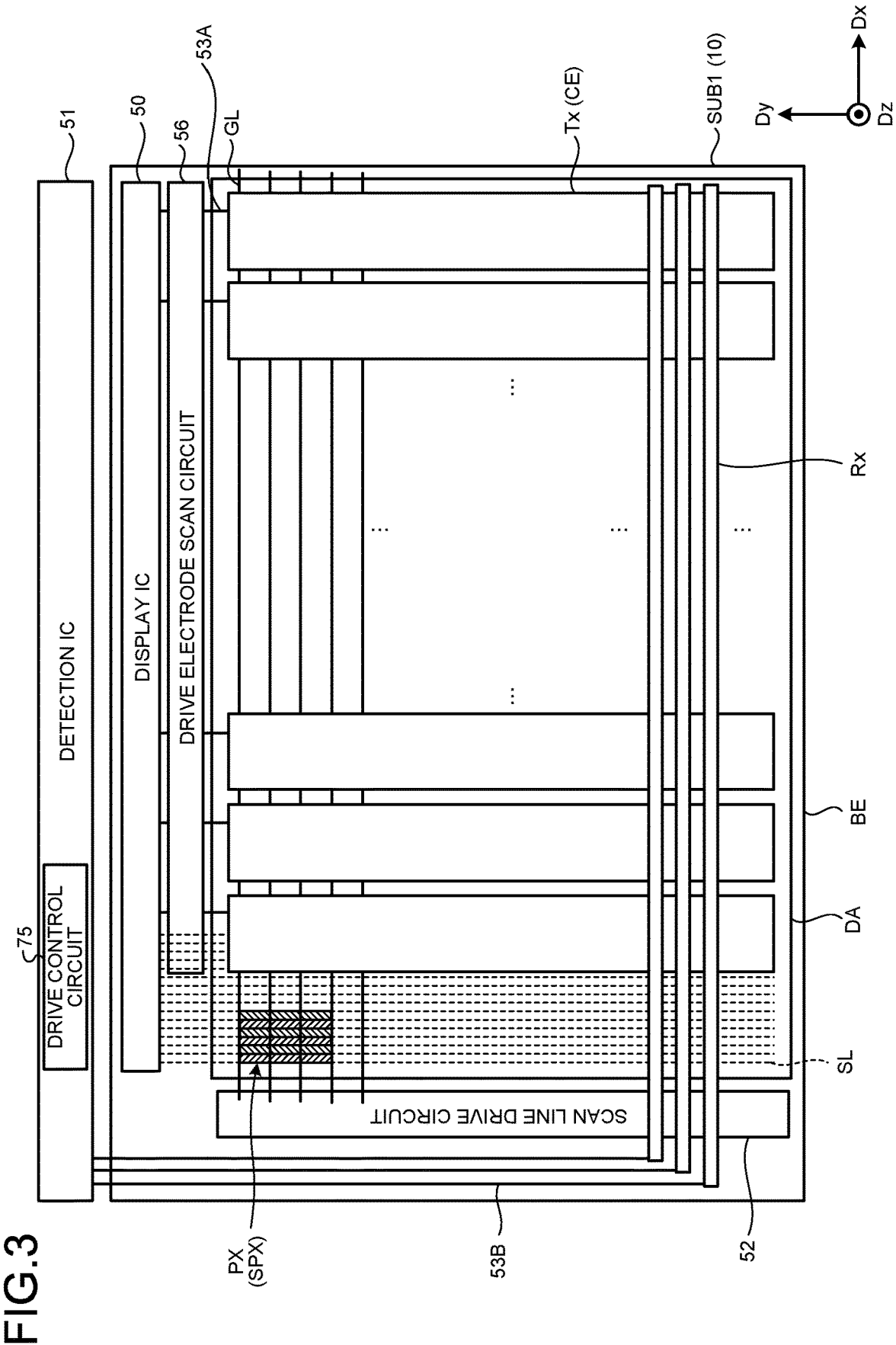
FIG. 3 is a plan view schematically illustrating an array substrate included in a display device.

FIG. 3 is a plan view schematically illustrating the array substrate included in the display device. FIG. 3 schematically illustrates a part of the detection electrodes Rx provided on the counter substrate SUB2 in order to explain the relation between the drive electrodes Tx and the detection electrodes Rx. As illustrated in FIG. 3, the pixels PX (sub pixels SPX) are arrayed in a matrix with a row-column configuration in the display region DA. The pixel signal lines SL and the scan lines GL are provided so as to correspond to the sub pixels SPX. The pixel signal lines SL are coupled to the control circuit such as the display IC 50 provided in the peripheral region BE. A scan line drive circuit 52 is provided in a region extending along the second direction Dy in the peripheral region BE. The scan lines GL are coupled to the scan line drive circuit 52. The scan line drive circuit 52 is a circuit configured to supply the scan signal for driving the pixels PX (sub pixels SPX) to the scan lines GL.

Each of the drive electrodes Tx extends in the second direction Dy and is aligned in the first direction Dx. The drive electrodes Tx are coupled to a drive electrode scan circuit 56 and the display IC 50 through respective coupling wiring lines 53A. Each of the detection electrodes Rx extends in the first direction Dx and is aligned in the second direction Dy. The detection electrodes Rx are coupled to the detection IC 51 through coupling wiring lines 53B. The drive electrodes Tx and the detection electrodes Rx are provided so as to intersect with each other in a plan view. An electrostatic capacitance is formed in each of intersecting portions of the drive electrodes Tx and the detection electrodes Rx. The detection IC 51 can detect the detection target based on the detection signals Vdet that are output in accordance with changes in the mutual electrostatic capacitances between the drive electrodes Tx and the detection electrodes Rx.

Although FIG. 3 illustrates only some drive electrodes Tx, some detection electrodes Rx, and some pixels PX (sub pixels SPX) in order to make the drawing easy to view, the drive electrodes Tx, the detection electrodes Rx, and the pixels PX are arranged on the entire display region DA. That is to say, the pixels PX are arranged so as to overlap with one drive electrode Tx. One drive electrode Tx is arranged so as to overlap with the pixel signal lines SL.

The drive electrodes Tx serve as common electrodes CE for forming an electric field between the drive electrodes Tx and pixel electrodes PE (not illustrated) in display and as the drive electrodes Tx for detecting the detection target such as the input support device 3 and the finger Fg in touch detection. To be specific, the display IC 50 supplies a display drive signal VCOM to the drive electrodes Tx in display. A drive control circuit 75 included in the detection IC 51 outputs a control signal to the drive electrode scan circuit 56, and the drive electrode scan circuit 56 supplies a first detection drive signal VD1 and a second detection drive signal VD2 to the drive electrodes Tx in order. Although FIG. 3 illustrates the drive electrode scan circuit 56 as a separate circuit from the display IC 50, the drive electrode scan circuit 56 is not limited thereto and may be a circuit integrated with the display IC 50.

Figure 4:
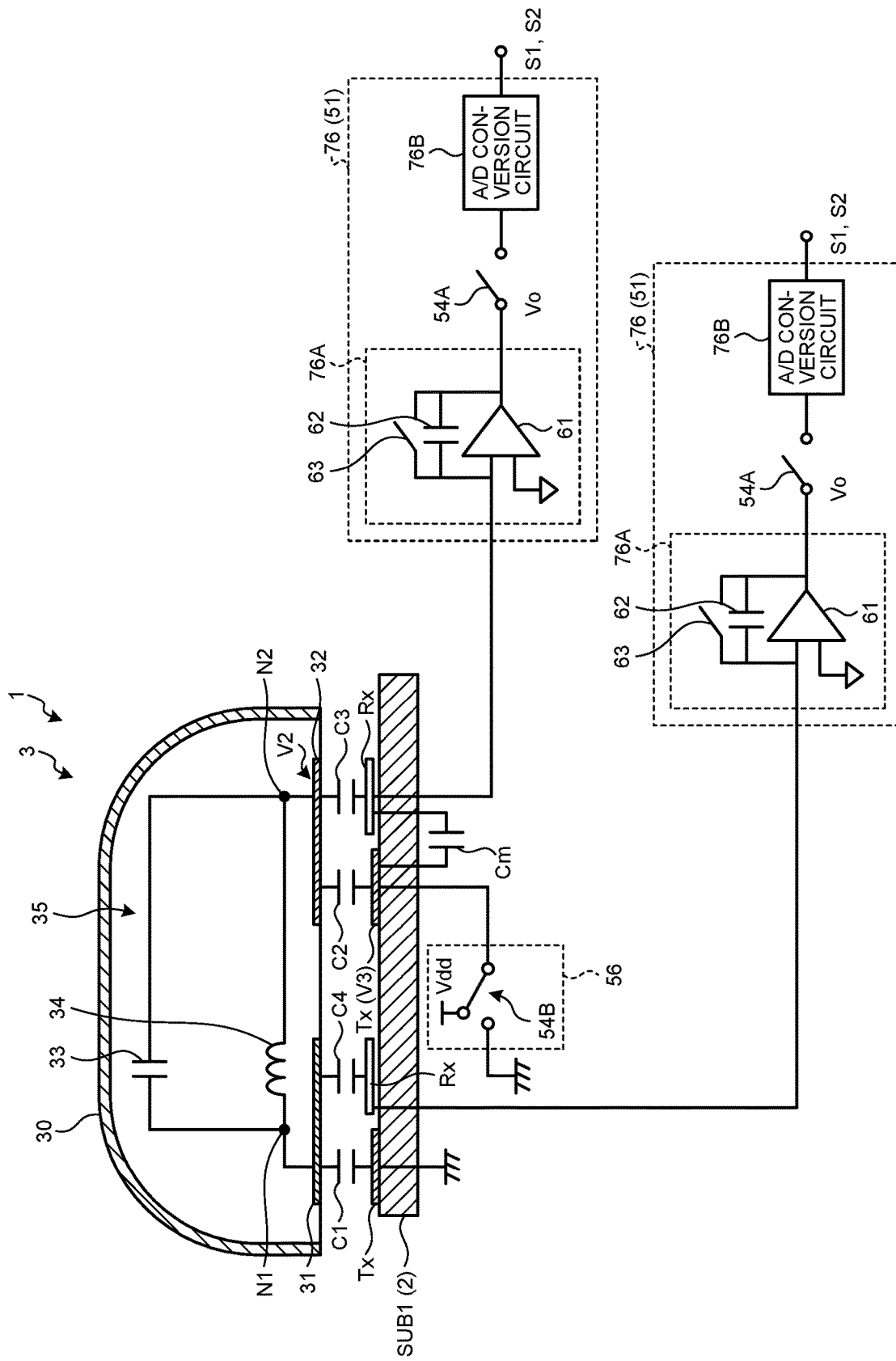
FIG. 4 is a descriptive view for explaining a method for detecting an input support device.

Next, a method for detecting the input support device 3 will be described with reference to FIG. 4 and FIG. 5. FIG. 4 is a descriptive view for explaining the method for detecting the input support device. As illustrated in FIG. 4, the first electrode 31 and the second electrode 32 of the input support device 3 can rotate around the rotating axis AX as described above. Each of the first electrode 31 and the second electrode 32 therefore faces the drive electrode Tx and the detection electrode Rx (refer to FIG. 4) at each certain instant in first detection periods TS1 and second detection periods TS2 (refer to FIG. 9).

As illustrated in FIG. 4, a capacitance C1 is formed between the first electrode 31 and one drive electrode Tx (the drive electrode Tx on the left side in FIG. 4). The one drive electrode Tx is coupled to a reference potential (for example, a reference potential Vdc). A capacitance C2 is formed between the second electrode 32 and the other drive electrode Tx (the drive electrode Tx on the right side in FIG. 4). The other drive electrode Tx is coupled to a power supply potential Vdd or the reference potential (for example, the reference potential Vdc) through a switch element 54B.

A capacitance C3 is formed between the second electrode 32 and the detection electrode Rx facing the second electrode 32. A capacitance C4 is formed between the first electrode 31 and the detection electrode Rx facing the first electrode 31. A mutual electrostatic capacitance Cm is formed between the drive electrode Tx and the detection electrode Rx.

Each of the detection electrodes Rx (the detection electrode Rx on the right side in FIG. 4 and the detection electrode Rx on the left side in FIG. 4) is coupled to the detection circuit 76. A configuration in which switch elements (not illustrated) are provided between the detection electrodes Rx and the detection circuit 76 and the detection electrodes Rx are coupled to the detection circuit 76 in the first detection periods TS1 and the second detection periods TS2, which will be described later, may be employed.

The detection circuit 76 is a signal processing circuit provided in the detection IC 51 and is a circuit configured to receive the detection signals Vdet (refer to FIG. 5) output from the detection electrodes Rx and perform predetermined signal processing thereon to output first detection values S1 and second detection values S2. The detection circuit 76 includes a detector 76A, a switch element 54A, and an A/D conversion circuit 76B. In the following explanation, when the first detection values S1 and the second detection values S2 need not to be distinguished from each other for explanation, they are referred to as detection values S simply.

The detector 76A is an integration circuit including a detection signal amplifier 61, a capacitive element 62, and a reset switch 63. The detector 76A receives the detection signals Vdet from the detection electrode Rx, performs signal processing thereon, and then, outputs an output signal Vo.

The switch element 54A provided in the detector 76A switches coupling and non-coupling between the detector 76A and the A/D conversion circuit 76B. The switch element 54A is turned ON (coupling state) to couple the detector 76A and the A/D conversion circuit 76B in periods overlapping with the first detection periods TS1 and the second detection periods TS2, which will be described later. The output signal Vo is thereby supplied to the A/D conversion circuit 76B via the switch element 54A. The switch element 54A is turned OFF (non-coupling state) and the detector 76A is not coupled to the A/D conversion circuit 76B in periods different from the first detection periods TS1 and the second detection periods TS2, which will be described later. The output signal Vo is not supplied to the A/D conversion circuit 76B in the periods where the switch element 54A is in the OFF state. The A/D conversion circuit 76B converts the output signal Vo as an analog signal into a digital signal and outputs the first detection values S1 and the second detection values S2.

In other words, ON/OFF control of the switch element 54A defines the lengths of the first detection periods TS1 and the second detection periods TS2 (refer to FIG. 7) as periods in which the detection values S are output from the detection circuit 76. The switch elements 54A that respectively correspond to the detection electrodes Rx are controlled to be switched into the ON or OFF state synchronously.

Figure 5:
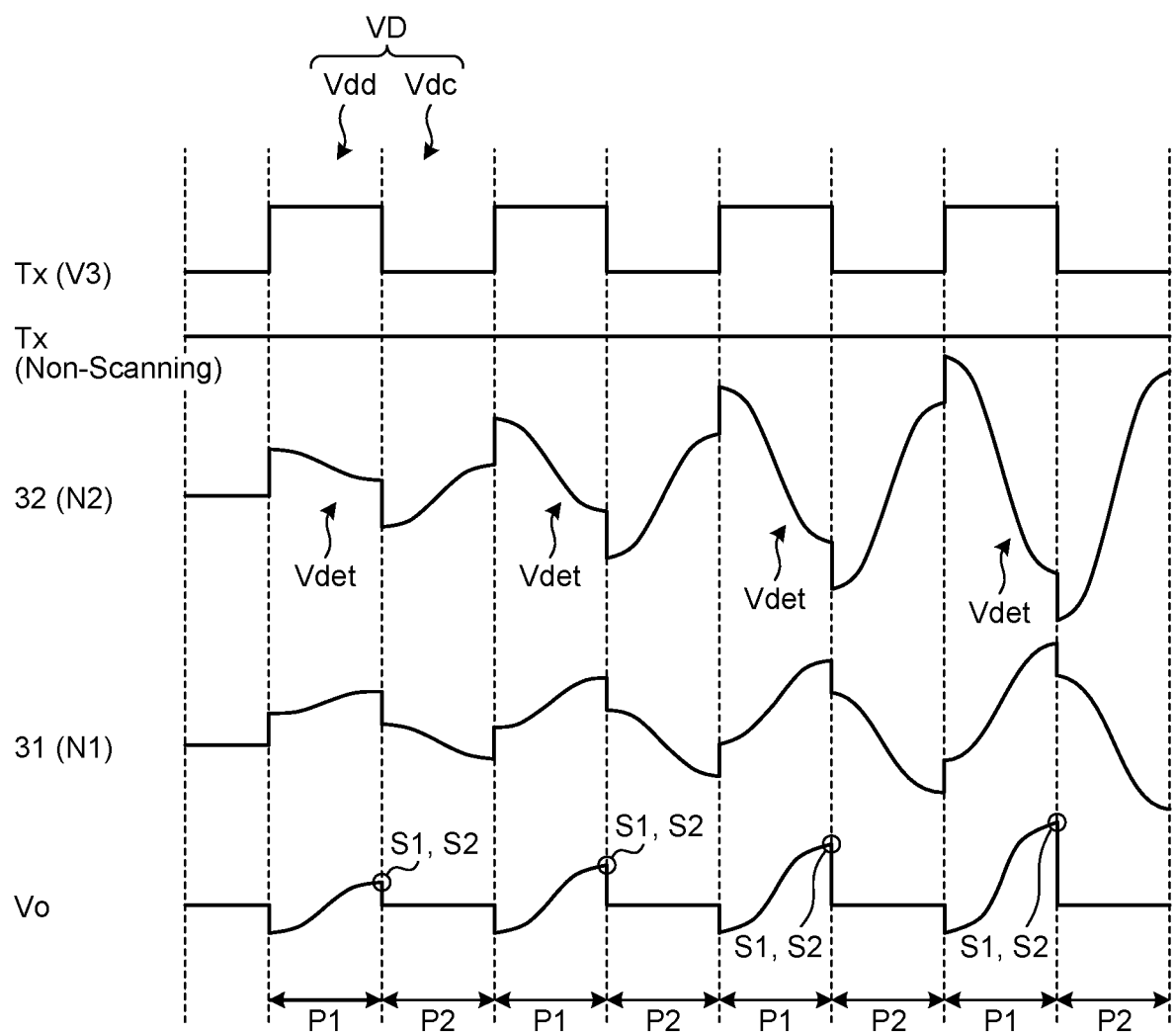
FIG. 5 is a timing waveform chart for explaining the method for detecting the input support device.

FIG. 5 is a timing waveform chart for explaining the method for detecting the input support device. As illustrated in FIG. 4 and FIG. 5, the detection drive signal VD of alternate rectangular waves is supplied to the other drive electrode Tx (the drive electrode Tx on the right side in FIG. 4) by an operation of the switch element 54B. To be more specific, the power supply potential Vdd at a high level potential and the reference potential Vdc at a low level potential are alternately applied repeatedly at a predetermined frequency with a switching operation of the switch element 54B, so that the detection drive signal VD is formed and is supplied to the other drive electrode Tx. A potential V3 of the other drive electrode Tx varies in accordance with the detection drive signal VD.

Periods that are repeated in synchronization with the detection drive signal VD are first periods P1 and second periods P2. The first period P1 is a period in which the other drive electrode Tx is coupled to the power supply potential Vdd (a period in which the switch element 54B couples the other drive electrode Tx and the power supply potential Vdd). The second period P2 is a period in which the other drive electrode Tx is coupled to the reference potential Vdc (a period in which the switch element 54B couples the other drive electrode Tx and the reference potential (ground potential)). The power supply potential Vdd is higher than the reference potential Vdc, for example. Although the detection drive signal VD is formed by a combination of one-time input of the power supply potential Vdd and one-time input of the reference potential Vdc in FIG. 5, the detection drive signal VD includes also the configuration in which alternate input of the power supply potential Vdd and the reference potential Vdc is repeated a plurality of number of times at a predetermined cycle.

The detection electrode Rx outputs the detection signals Vdet based on the mutual electrostatic capacitance Cm. To be specific, one drive electrode Tx (the drive electrode Tx on the left side in FIG. 4) is coupled to the reference potential (for example, the reference potential Vdc) in both of the first periods P1 and the second periods P2, as described above. Signals at different potentials are thereby supplied to the first electrode 31 and the second electrode 32 in the first periods P1.

Variation in a potential based on the mutual electrostatic capacitance Cm is output, as the detection signals Vdet, to the detection circuit 76 from the detection electrode Rx. The detection signal amplifier 61 of the detector 76A amplifies the detection signals Vdet supplied from the detection electrode Rx. A reference voltage having a fixed potential is input to a non-inverting input portion of the detection signal amplifier 61, and the detection electrode Rx is coupled to an inverting input portion. A signal (for example, the reference potential Vdc) that is the same as that to the one drive electrode Tx is input as the reference voltage in the present embodiment. The same signal as that (for example, the AC rectangular waves formed by the power supply potential Vdd and the power supply potential Vdc) to the other drive electrode may be input to the inverting input portion. The detection circuit 76 can reset charges of the capacitive element 62 by turning the reset switch 63 ON.

The A/D conversion circuit 76B of the detection circuit 76 samples the output signal Vo at a predetermined cycle and outputs the first detection values S1 and the second detection values S2.

The detection drive signal VD (the first detection drive signal VD1, which will be described later) has the same frequency as the resonant frequency of the LC circuit 35. In the present embodiment, for example, the switching operation of the switch element 54B is performed based on the resonant frequency to form the first detection drive signal VD1 having the resonant frequency. Accordingly, the second electrode 32 overlapping with the other drive electrode Tx is also driven at the resonant frequency, so that resonance of the LC circuit 35 is generated. The amplitudes of the detection signals Vdet are increased as the first periods P1 and the second periods P2 are repeated based on the above-mentioned resonant frequency in the detection periods. As a result, the potentials of the output signal Vo and the detection values S from the detection circuit 76 vary to be increased over time until a certain period (refer to FIG. 5).

With the resonance of the LC circuit 35, the waveform that is generated in the first electrode 31 is different from the waveform that is generated in the second electrode 32, and the potentials of the first electrode 31 and the second electrode 32 vary such that the polarities thereof invert from each other. To be specific, the potential of the first electrode 31 varies to be increased and the potential of the second electrode 32 varies to be decreased in each first period P1. The potential of the first electrode 31 varies to be decreased and the potential of the second electrode 32 varies to be increased in each second period P2.

Accordingly, the detection signals Vdet that are output from the detection electrode Rx overlapping with the first electrode 31 and the output signal Vo (not illustrated) and the detection signals Vdet that are output from the detection electrode Rx overlapping with the second electrode 32 and the output signal Vo have different polarities. The input detection system 1 may detect various pieces of information of the input support device 3 based on the detection values S of the detection signals Vdet having different polarities.

On the other hand, when the detection target different from the input support device 3, such as the finger Fg, comes into contact with or close to the upper surface 111a (refer to FIG. 1), the detection signals Vdet vary in accordance with the change in the mutual electrostatic capacitance Cm. That is to say, since no resonance is generated with the detection of the finger Fg or the like, change in the amplitudes of the detection signals Vdet over time as illustrated in FIG. 5 does not occur. The detection values S of the detection signals Vdet having the same polarity are detected with the detection of the finger Fg or the like. The input detection system 1 can thus determine whether the detection target is the finger Fg or the input support device 3 using the LC resonance of the LC circuit 35.

Figure 6:
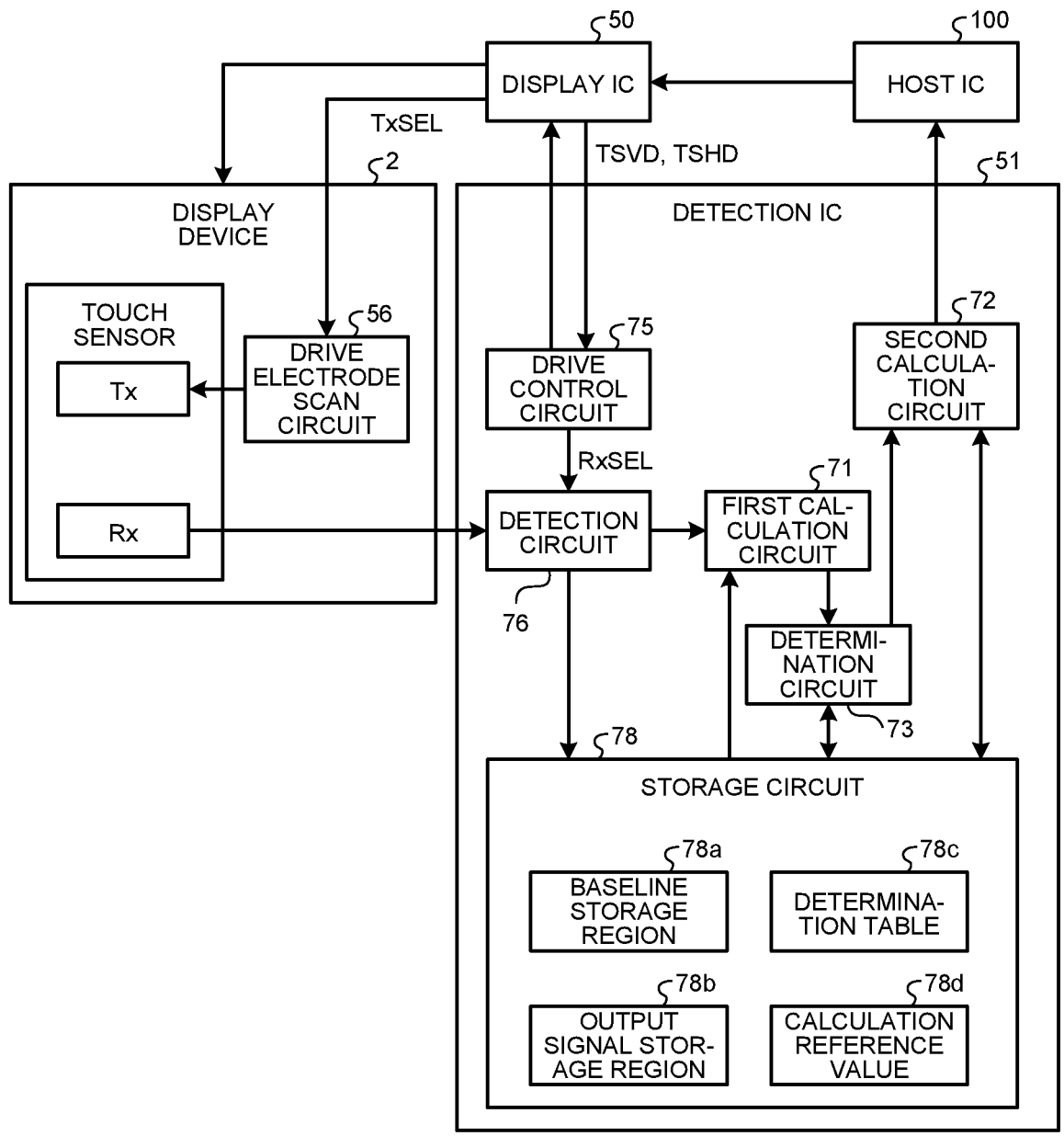
FIG. 6 is a block diagram schematically illustrating an example of the configuration of the input detection system.

FIG. 6 is a block diagram illustrating an example of the configuration of the input detection system. FIG. 6 illustrates components related to the detection of the detection target such as the input support device 3 and the finger Fg by the display device 2 (touch sensor) and omits illustration of components of the display IC 50 related to the display operation.

As illustrated in FIG. 6, the display IC 50 outputs control signals TSVD and TSHD to the detection IC 51. The detection IC 51 executes detection for one frame by scanning the drive electrodes Tx based on the control signals TSVD and TSHD. The detection IC 51 outputs a drive control signal to the display IC 50.

The display IC 50 outputs various control signals such as a drive electrode selection signal TxSEL to the drive electrode scan circuit 56. The drive electrode scan circuit 56 selects the drive electrode Tx to be driven in order among the drive electrodes Tx based on the control signals (the drive electrode selection signal TxSEL and the like) from the display IC 50 and supplies the detection drive signal VD to the drive electrode Tx to be driven.

The detection IC 51 includes a first calculation circuit 71, a second calculation circuit 72, a determination circuit 73, the drive control circuit 75, the detection circuit 76, and a storage circuit 78. The detection circuit 76 performs the signal processing on the detection signals Vdet output from the detection electrodes Rx as described above. The first calculation circuit 71 performs calculation processing based on the detection values S from the detection circuit 76. The first calculation circuit 71 is a circuit configured to perform, for example, calculation processing of differences between the detection values S and a baseline and calculation processing in the touch detection of the finger Fg or the like, which will be described later.

The determination circuit 73 is a circuit configured to receive results of the calculation processing from the first calculation circuit 71 and make determination about presence or absence of the detection target and the type of the detection target such as the input support device 3 and the finger Fg.

The second calculation circuit 72 is a circuit configured to calculate information (for example, position coordinates of the finger Fg, or position coordinates and the rotation operation RT of the input support device 3) about an input operation by the finger Fg or the input support device 3 when the detection target such as the input support device 3 and the finger Fg is detected. The second calculation circuit 72 transmits, to a host IC 100, the information about the input operation by the finger Fg or the input support device 3 that has been provided as a calculation result. The host IC 100 outputs a control signal to the display IC 50 to perform display in accordance with the input operation.

The storage circuit 78 is a circuit configured to store therein various data that is used for calculation of the detection signals Vdet of the finger Fg or the input support device 3. The storage circuit 78 includes, for example, a baseline storage region 78a, an output signal storage region 78b, a determination table 78c, and a calculation reference value 78d.

The baseline storage region 78a stores therein information of the baseline of the display device 2. The baseline is information of the output signals Vo for one frame when the drive electrodes Tx are scanned in a state where, for example, the detection target such as the input support device 3 and the finger Fg is absent on the display region DA. The detection IC 51 may acquire the baseline at predetermined timing when the display device 2 is powered on, and so on.

Figure 8:
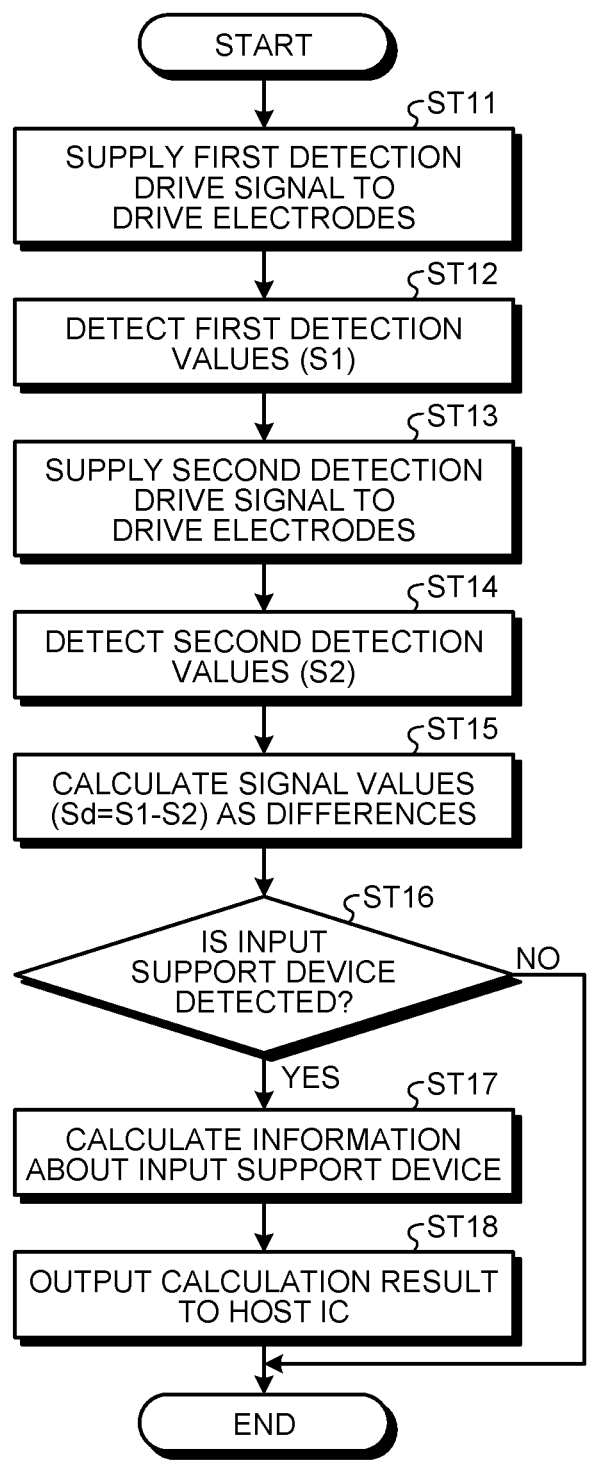
FIG. 8 is a flowchart for explaining the method for detecting the input support device.

The output signal storage region 78b stores therein the output signals Vo output from the detection circuit 76 as the first detection values S1 and the second detection values S2 (refer to FIG. 8). The output signal storage region 78b stores therein, for example, information formed by the output signals Vo for one frame as frame data. The output signal storage region 78b temporarily stores therein data of the first detection values S1 and the second detection values S2 (refer to FIG. 8) for one frame that are used in calculation of the differences, and the like.

The determination table 78c stores therein information that is used for determining the type of the detection target such as the input support device 3 and the finger Fg. The determination table 78c stores therein a threshold (reference value) for determining the input support device 3 and a threshold (reference value) for determining the detection target differing from the input support device 3, such as the finger Fg. Alternatively, the determination table 78c may store therein a detection pattern (for example, information of two-dimensional distribution of the first detection values S1 and the second detection values S2) for determining the input support device 3. The determination circuit 73 compares the results of the calculation processing from the first calculation circuit 71 with the thresholds from the determination table 78c to determine the type of the detection target such as the input support device 3 and the finger Fg.

The calculation reference value 78d stores therein various thresholds (reference values) for calculation of the information (for example, the position coordinates of the finger Fg, or the position coordinates and the rotation operation RT of the input support device 3) about the input operation by the finger Fg or the input support device 3. The second calculation circuit 72 compares the pieces of information from the first calculation circuit 71 and the determination circuit 73 and the thresholds stored in the calculation reference value 78d to calculate various pieces of information such as the position of the detection target such as the input support device 3 and the finger Fg.

The drive control circuit 75 is a circuit configured to output the drive control signal to the display IC 50 based on the control signals TSVD and TSHD from the display IC 50. The drive control circuit 75 is a circuit configured to output a detection electrode selection signal RxSEL to the detection circuit 76 based on the control signals TSVD and TSHD from the display IC 50. ON and OFF of each switch element 54A of the detection circuit 76 is switched based on the detection electrode selection signal RxSEL.

Figure 7:
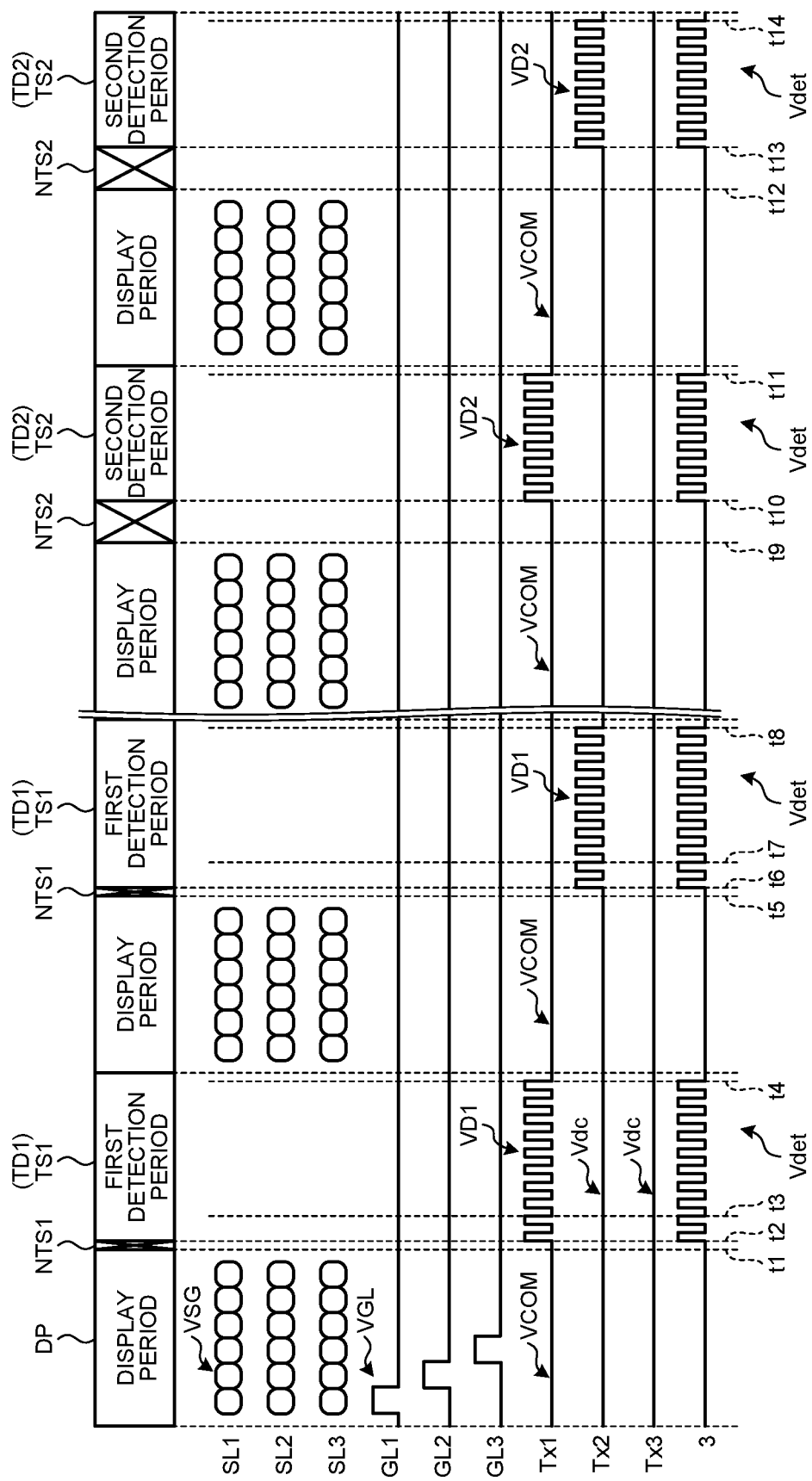
FIG. 7 is a timing waveform chart for explaining display periods and detection periods of the input detection system.

FIG. 7 is a timing waveform chart for explaining display periods and detection periods of the input detection system. As illustrated in FIG. 7, the display periods and the detection periods are alternately arranged in a time division manner in the input detection system 1. FIG. 7 is merely a schematically illustrated timing waveform chart, and the length of each period, the number of pixel signal lines SL, scan lines GL, and drive electrodes Tx, and the like are not limited to those in the timing waveform chart.

To be more specific, the input detection system 1 executes a display period (first display period), a first detection period TS1, the display period (first display period), the first detection period TS1, . . . , a display period (second display period), a second detection period TS2, the display period (second display period), the second detection period TS2, . . . , and so on alternately in the time division manner.

The scan line drive circuit 52 supplies a scan signal VGL to scan lines GL1, GL2, GL3, and the like in order in the display periods. The display IC 50 supplies the pixel signals VSG to pixel signal lines SL1, SL2, SL3, and the like based on the image signal from host IC 100. The pixel signals VSG are thereby supplied to the pixels PX (sub pixels SPX) selected based on the scan signal VGL in order, so that the image is displayed. The display IC 50 supplies the display drive signal VCOM to all the drive electrodes Tx through the drive electrode scan circuit 56 in the display periods. The drive electrodes Tx thereby serve as the common electrodes in the display periods. The pixel signals VSG for one frame may be written in one display period, or the pixel signals VSG for a portion provided by dividing one frame into a plurality of regions may be written in one display period.

Writing of the pixel signals VSG to the pixel signal lines SL in the display period (first display period) is completed at time t1. After the display period (first display period) is ended, a first non-detection period NTS1 is provided for a predetermined period.

The first non-detection period NTS1 is provided between the display period (first display period) and the first detection period TS1 and is a period in which the detection circuit 76 outputs no first detection value S1. The drive electrode scan circuit 56 does not supply the first detection drive signal VD1 to the drive electrodes Tx in a period overlapping with the first non-detection period NTS1 (hereinafter, referred to as a first non-drive period NTD1 (refer to FIG. 10)). The first non-detection period NTS1 may not be provided.

The first detection period TS1 is started and the drive electrode scan circuit 56 starts supply of the first detection drive signal VD1 to the drive electrode Tx at time t2. The drive electrode scan circuit 56 supplies the first detection drive signal VD1 to the drive electrodes Tx1, Tx2, and Tx3 in order in periods overlapping with the first detection periods TS1 (hereinafter, referred to as first drive periods TD1 (refer to FIG. 10)). The first detection drive signal VD1 has the resonant frequency of the LC circuit 35 of the input support device 3. The detection electrode Rx superimposed with the input support device 3 outputs the detection signals Vdet using the resonance of the LC circuit 35.

The first detection period TS1 is a period in which the detection circuit 76 receives the detection signal Vdet in accordance with the first detection drive signal VD1 in the first drive period TD1 and outputs the first detection values S1. That is to say, the first detection period TS1 is defined, for example, as a period in which the switch elements 54A (refer to FIG. 4) included in the detection circuit 76 are in the ON states. The first non-detection period NTS1 is defined, for example, as a period in which the switch elements 54A included in the detection circuit 76 are in the OFF states.

The first detection period TS1 and the first drive period TD1 are ended at time t4. That is to say, the supply of the first detection drive signal VD1 by the drive electrode scan circuit 56 is finished and the detection by the detection circuit 76 is finished (the switch element 54A is turned OFF) at time t4. The subsequent display period is then started. Thereafter, the above-mentioned operations are repeatedly executed at times t5, t6, t7, and t8. The time t3 in FIG. 7 virtually indicates the start time of the detection period when the first non-detection period NTS1 is set to have the same length as a second non-detection period NTS2, which will be described later, and indicates that the supply of the first detection drive signal VD1 is started earlier than the time t3 corresponding to the second detection period TS2.

Then, writing of the pixel signals VSG to the pixel signal lines SL in the display period (second display period) is completed at time t9. After the display period (second display period) is ended, the second non-detection period NTS2 is provided for a predetermined period.

The second non-detection period NTS2 is provided between the display period (second display period) and the second detection period TS2 and is a period in which the detection circuit 76 outputs no second detection value S2. The drive electrode scan circuit 56 stops supply of the second detection drive signal VD2 in a period overlapping with the second non-detection period NTS2 (hereinafter, referred to as a second non-drive period NTD2 (refer to FIG. 10)). The first non-detection period NTS1, the first non-drive period NTD1, the second non-detection period NTS2, and the second non-drive period NTD2 are provided in order to synchronize and stabilize various signals by stopping the supply of the detection drive signals VD and the operation of the detection circuit 76 for predetermined periods.

The second detection period TS2 is started and the drive electrode scan circuit 56 starts supply of the second detection drive signal VD2 to the drive electrode Tx at time t10. The drive electrode scan circuit 56 supplies the second detection drive signal VD2 to the drive electrodes Tx1, Tx2, and Tx3 in order in periods overlapping with the second detection periods TS2 (hereinafter, referred to as second drive periods TD2 (refer to FIG. 10)). The second detection drive signal VD2 has a frequency (non-resonant frequency) different from the resonant frequency of the LC circuit 35 of the input support device 3. The detection electrode Rx superimposed with the input support device 3 outputs the detection signal Vdet in accordance with change in the mutual electrostatic capacitance without using the resonance of the LC circuit 35.

The second detection period TS2 is a period in which the detection circuit 76 receives the detection signal Vdet in accordance with the second detection drive signal VD2 in the second drive period TD2 and outputs the second detection values S2. That is to say, the second detection period TS2 is defined, for example, as a period in which the switch elements 54A (refer to FIG. 4) included in the detection circuit 76 are in the ON states. The second non-detection period NTS2 is defined, for example, as a period in which the switch elements 54A included in the detection circuit 76 are in the OFF states.

The second detection period TS2 and the second drive period TD2 are ended at time tn. That is to say, the supply of the second detection drive signal VD2 by the drive electrode scan circuit 56 is finished and the detection by the detection circuit 76 is finished (the switch elements 54A are turned OFF) at time tn. The subsequent display period is then started. Thereafter, the above-mentioned operations are repeatedly executed at times t12, t13, and t14.

In the present embodiment, the first detection periods TS1 and the first drive periods TD1 are longer than the second detection periods TS2 and the second drive periods TD2. The first non-detection periods NTS1 and the first non-drive periods NTD1 are shorter than the second non-detection periods NTS2 and the second non-drive periods NTD2. That is to say, periods until the supply of the first detection drive signal VD1 is started in the first detection periods TS1 and the first drive periods TD1 after the display periods (first display periods) are ended are shorter than periods until the supply of the second detection drive signal VD2 is started in the second detection periods TS2 and the second drive periods TD2 after the display periods (second display periods) are ended.

The first detection periods TS1 and the first drive periods TD1 have the same length, are started at the same timing, and are ended at the same timing. The second detection periods TS2 and the second drive periods TD2 have the same length, are started at the same timing, and are ended at the same timing. That is to say, the drive electrode scan circuit 56 and the detection circuit 76 execute driving and detection synchronously. The intervals between the display periods DP are uniform. In other words, the total length of the first non-detection periods NTS1 and the first detection periods TS1 is the same as the total length of the second non-detection periods NTS2 and the second detection periods TS2.

With such driving, the lengths of the first detection periods TS1 and the first drive periods TD1 corresponding to the first detection periods TS1 are longer than those of the second detection periods TS2 and the second drive periods TD2 corresponding to the second detection periods TS2 without changing a display operation cycle while the intervals between the adjacent display periods are constant. The first detection values S1 based on the detection signals Vdet using the resonance of the LC circuit 35 are larger than those when the first detection periods TS1 and the first drive periods TD1 and the second detection periods TS2 and the second drive periods TD2 are provided to have the same length, thereby improving the detection sensitivity.

Although in FIG. 7, drive electrode Tx1 or Tx2 is driven in each detection period, FIG. 7 is schematically illustrated, and equal to or more than two drive electrodes Tx may be driven in order in one detection period. Although the reference potential Vdc that is supplied to the drive electrodes Tx in the detection periods is a signal having the same potential as the display drive signal VCOM, the reference potential Vdc is not limited thereto. The reference potential Vdc may be a signal having a different potential from that of the display drive signal VCOM. It is sufficient that in the input detection system 1, potential difference is generated between the first electrode 31 and the second electrode 32 so as to generate the resonance of the LC circuit 35. That is to say, the detection drive signal VD may be supplied to the drive electrode Tx overlapping with the first electrode 31, and the reference potential Vdc may be supplied to the drive electrode Tx overlapping with the second electrode 32.

FIG. 8 is a flowchart for explaining the method for detecting the input support device. As illustrated in FIG. 8, the drive electrode scan circuit 56 (refer to FIG. 6) supplies the first detection drive signal VD1 to the drive electrodes Tx in order in the first detection periods TS1 and the first drive periods TD1 (step ST11).

The detection electrodes Rx output, to the detection IC 51, changes in the mutual electrostatic capacitances between the detection electrodes Rx and the drive electrodes Tx and signals generated by the resonance of the LC circuit 35 as the detection signals Vdet. The detection circuit 76 of the detection IC 51 performs the signal processing on the detection signals Vdet output from the detection electrodes Rx. The detection circuit 76 of the detection IC 51 then detects the first detection values S1 based on the detection signals Vdet for one frame (step ST12). The amplitudes of the detection signals Vdet increase over time by being influenced by the resonance phenomenon caused by the LC circuit 35 of the input support device 3, and then, predetermined amplitudes thereof are kept.

The drive electrode scan circuit 56 (refer to FIG. 6) supplies the second detection drive signal VD2 to the drive electrodes Tx in order in the second detection periods TS2 and the second drive periods TD2 (step ST13). At step ST13, since the resonance of the LC circuit 35 is not generated, changes in the amplitudes of the detection signals Vdet over time as illustrated in FIG. 6 do not occur.

The detection electrodes Rx output, to the detection circuit 76 of the detection IC 51, changes in the mutual electrostatic capacitances between the detection electrodes Rx and the drive electrodes Tx as the detection signals Vdet. The detection circuit 76 of the detection IC 51 performs the signal processing on the detection signals Vdet output from the detection electrodes Rx. The detection circuit 76 of the detection IC 51 then detects the second detection values S2 based on the detection signals Vdet for one frame (step ST14).

The first calculation circuit 71 (refer to FIG. 8) calculates signal values Sd (S1-S2) as differences between the first detection values S1 and the second detection values S2 (step ST15). To be more specific, the first calculation circuit 71 detects the input support device 3 based on the signal values Sd as the differences between the first detection values S1 for one frame that are detected when the first detection drive signal VD1 having the resonant frequency of the LC circuit 35 is supplied to at least equal to or more than one drive electrode Tx and the second detection values S2 for one frame that are detected when the second detection drive signal VD2 having the non-resonant frequency different from the resonant frequency is supplied thereto.

The determination circuit 73 (refer to FIG. 6) compares the signal values Sd as the differences with the threshold to determine whether the input support device 3 is detected (step ST16). When the input support device 3 is detected (Yes at step ST16), the second calculation circuit 72 calculates information about the input operation such as the position coordinates and the rotation operation RT of the input support device 3 based on the two-dimensional distribution (detection pattern) of the signal values Sd (step ST17).

The second calculation circuit 72 outputs, to the host IC 100, the calculation result provided at step ST17, that is, the information about the input operation by the input support device 3 (step ST18). The host IC 100 outputs the control signal to the display IC 50 to perform display in accordance with the input operation.

When the input support device 3 is not detected (No at step ST16), the second calculation circuit 72 can omit the calculation at step ST17 and repeatedly executes the subsequent detection periods and display periods.

The above-mentioned method for detecting the input support device 3 is only an example and can be appropriately modified. For example, in the flow illustrated in FIG. 15, detection by the first detection drive signal VD1 (steps ST11 and ST12) and detection by the second detection drive signal VD2 (steps ST13 and ST14) may be performed in the reversed order.

Figure 9:
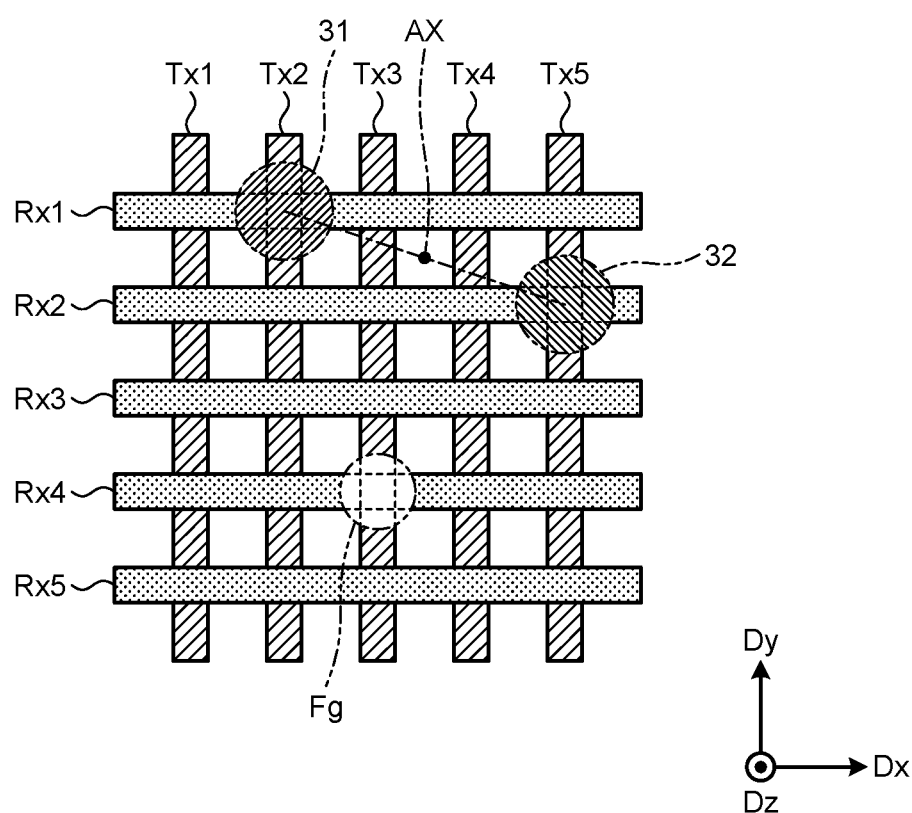
FIG. 9 is a plan view schematically illustrating the input support device, a detection target such as a finger, a plurality of drive electrodes, and a plurality of detection electrodes at certain timing.

Next, detailed operations in the first detection periods TS1 and the second detection periods TS2 are explained with reference to FIGS. 9 to 12. FIG. 9 is a plan view schematically illustrating the input support device, the detection target such as the finger, the drive electrodes, and the detection electrodes at certain timing. In FIG. 9, the first electrode 31 and the second electrode 32 of the input support device 3 are indicated by chain double-dashed circles in order to make the drawing easy to view. In FIG. 9, the finger Fg is also indicated by a chain double-dashed circle.

In FIG. 9, the drive electrodes Tx aligned in the first direction Dx are represented by drive electrodes Tx1, Tx2, Tx3, Tx4, and Tx5. The detection electrodes Rx aligned in the second direction Dy are represented by detection electrodes Rx1, Rx2, Rx3, Rx4, and Rx5.

The first electrode 31 of the input support device 3 is located at an intersecting portion of the drive electrode Tx2 and the detection electrode Rx1. The second electrode 32 of the input support device 3 is located at an intersecting portion of the drive electrode Tx5 and the detection electrode Rx2. The finger Fg is located at an intersecting portion of the drive electrode Tx3 and the detection electrode Rx4.

FIG. 9 illustrates the first electrode 31 and the second electrode 32 so as to have the same shape and the same area in a plan view for facilitating explanation. The first electrode 31 and the second electrode 32 may however have different shapes and different areas in a plan view. In other words, the number of drive electrodes Tx superimposed with the first electrode 31 and the total area of the drive electrode(s) Tx superimposed with the first electrode 31 may differ from the number of drive electrodes Tx superimposed with the second electrode 32 and the total area of the drive electrode(s) Tx superimposed with the second electrode 32. The shapes of the first electrode 31 and the second electrode 32 are not limited to those in the example illustrated in FIG. 9 and may be another shapes such as square shapes and polygonal shapes. The number of drive electrodes Tx overlapping with each of the first electrode 31 and the second electrode 32 may be two, three, or equal to or more than five.

Figure 10:
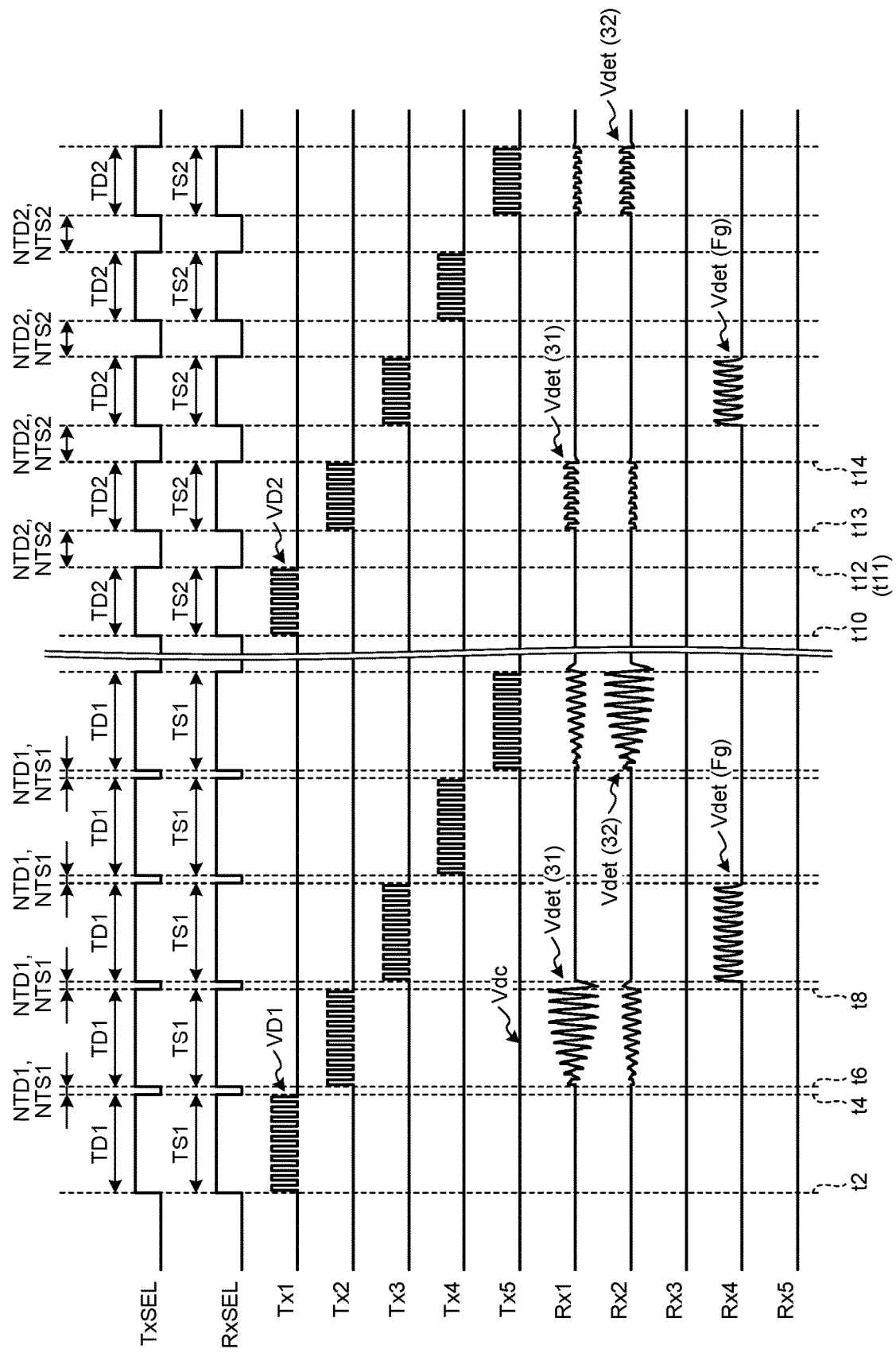
FIG. 10 is a timing waveform chart for explaining first detection periods and second detection periods of the input detection system.
Figure 11:
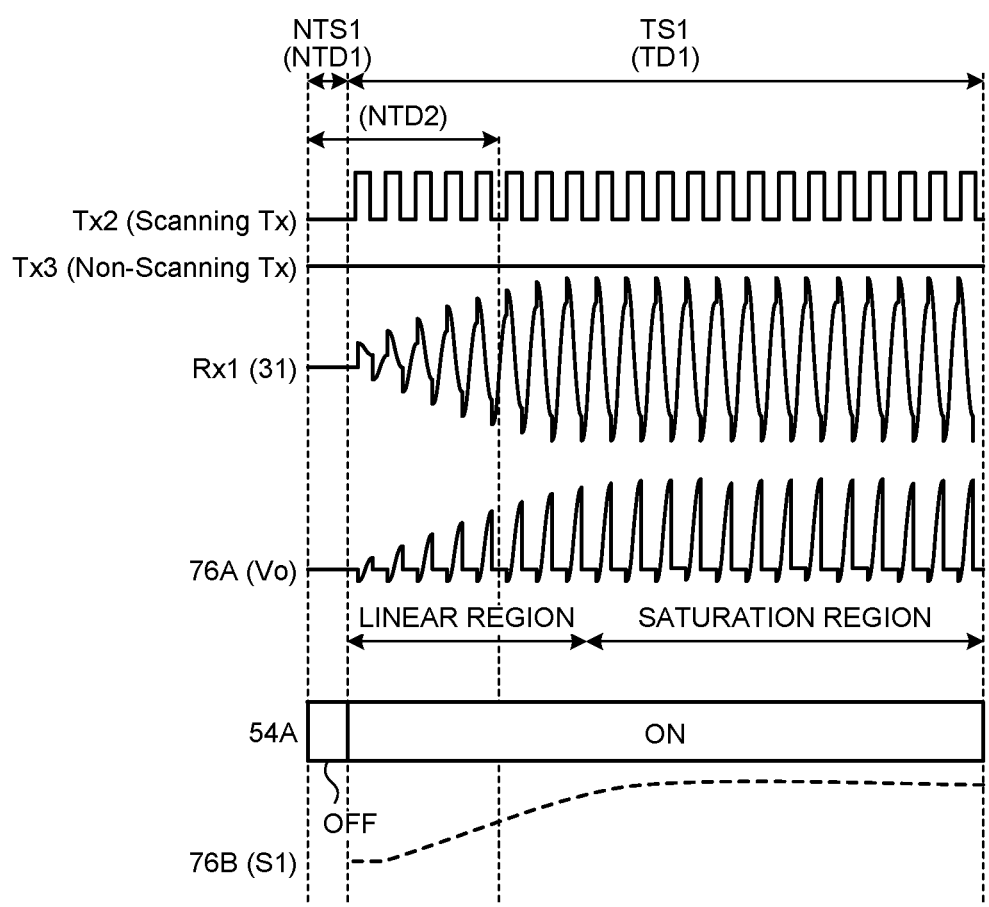
FIG. 11 is a timing waveform chart for explaining the first detection period of the input detection system.
Figure 12:
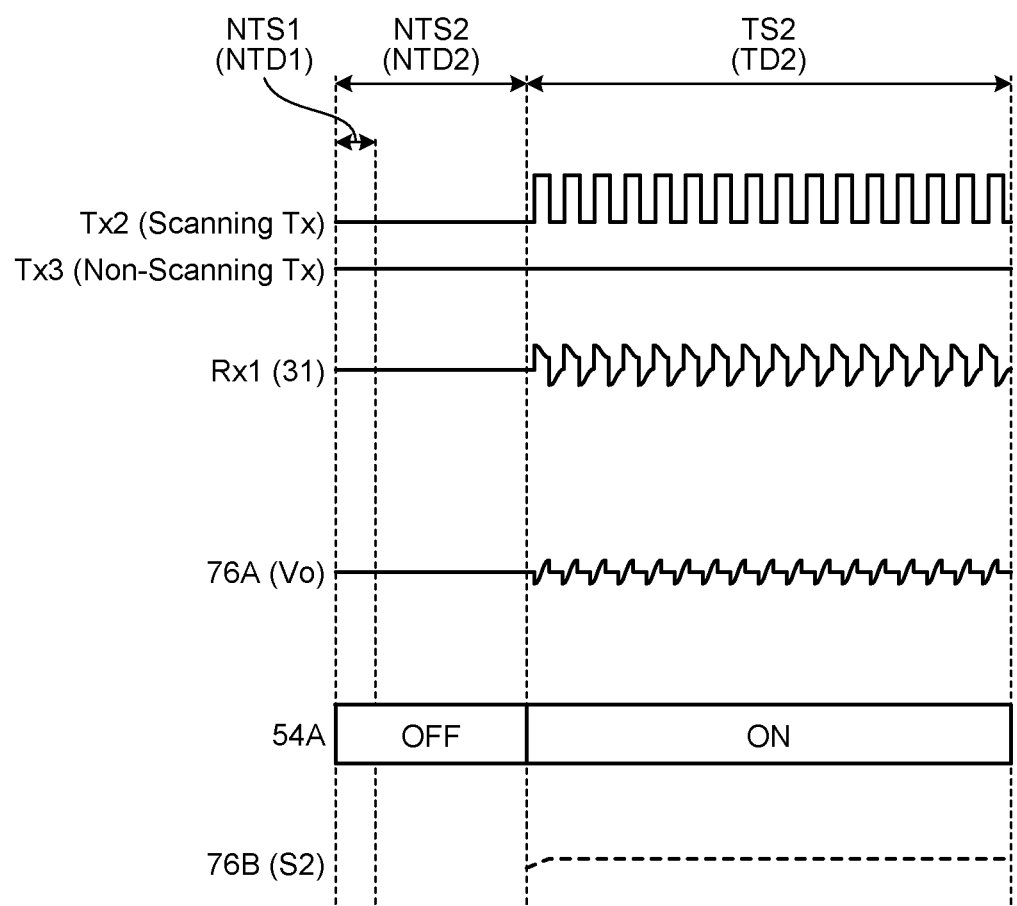
FIG. 12 is a timing waveform chart for explaining the second detection period of the input detection system.

FIG. 10 is a timing waveform chart for explaining the first detection periods and the second detection periods of the input detection system. FIG. 11 is a timing waveform chart for explaining the first detection period of the input detection system. FIG. 12 is a timing waveform chart for explaining the second detection period of the input detection system.

FIG. 10 omits the display periods (the first display periods and the second display periods) for illustration in order to make the drawing easy to view. FIG. 11 illustrates details of a period in which the first detection drive signal VD1 is supplied to the drive electrode Tx2 (time t4 to time t8) among the first detection periods TS1 illustrated in FIG. 10. FIG. 12 illustrates details of a period in which the second detection drive signal VD2 is supplied to the drive electrode Tx2 (time t12 to time t14) among the second detection periods TS2 illustrated in FIG. 10.

As illustrated in FIG. 10, the drive electrode scan circuit 56 alternately executes the first drive periods TD1, the first non-drive periods NTD1, the second drive periods TD2, and the second non-drive periods NTD2 in a time division manner in accordance with the drive electrode selection signal TxSEL.

Periods that correspond to the first detection periods TS1 and in which the drive electrode selection signal TxSEL is at an H level are referred to as the first drive periods TD1, and periods in which the drive electrode selection signal TxSEL is at an L level are referred to as the first non-drive periods NTD1. As described above, the drive electrode scan circuit 56 supplies the first detection drive signal VD1 to the drive electrodes Tx to be driven in order in the first drive periods TD1, respectively. The drive electrode scan circuit 56 does not supply the first detection drive signal VD1 to the drive electrodes Tx in the first non-drive periods NTD1.

Periods that correspond to the second detection periods TS2 and in which the drive electrode selection signal TxSEL is at the H level are referred to as the second drive periods TD2, and periods in which the drive electrode selection signal TxSEL is at the L level are referred to as the second non-drive periods NTD2. As described above, the drive electrode scan circuit 56 supplies the second detection drive signal VD2 to the drive electrodes Tx to be driven in order in the second drive periods TD2, respectively. The drive electrode scan circuit 56 does not supply the second detection drive signal VD2 to the drive electrodes Tx in the second non-drive periods NTD2.

The detection circuit 76 alternately executes the first detection periods TS1, the first non-detection periods NTS1, the second detection periods TS2, and the second non-detection periods NTS2 in a time division manner in accordance with the detection electrode selection signal RxSEL.

Periods that correspond to the first drive periods TD1 and in which the detection electrode selection signal RxSEL is at an H level are referred to as the first detection periods TS1, and periods in which the detection electrode selection signal RxSEL is at an L level are referred to as the first non-detection periods NTS1. As described above, the detection circuit 76 receives the detection signal Vdet in accordance with the first detection drive signal VD1 in each first detection period TS1 and performs the signal processing on the detection signal Vdet to output the first detection values S1.

Periods that correspond to the second drive periods TD2 and in which the detection electrode selection signal RxSEL is at the H level are referred to as the second detection periods TS2, and periods in which the detection electrode selection signal RxSEL is at the L level are referred to as the second non-detection period NTS2. As described above, the detection circuit 76 receives the detection signal Vdet in accordance with the second detection drive signal VD2 in each second detection period TS2 and performs the signal processing on the detection signal Vdet to output the second detection values S2.

Although not illustrated in FIG. 10, switching between the first drive periods TD1 and the first detection periods TS1 and the second drive periods TD2 and the second detection periods TS2 is executed based on the control signals TSVD and TSHD from the display IC 50.

As illustrated in FIGS. 10 and 11, the resonance of the LC circuit 35 causes the amplitude of the detection signal Vdet that is output from the detection electrode Rx1 to be increased over time in the period in which the first detection drive signal VD1 is supplied to the drive electrode Tx2 superimposed with the first electrode 31 and the reference potential Vdc is supplied to the drive electrode Tx5 superimposed with the second electrode 32 in the first detection period TS1 and the first drive period TD1. As illustrated in FIG. 11, the output signal Vo that is output from the detector 76A of the detection circuit 76 has a linear region where the amplitude increases linearly first, followed by a saturation region where the amplitude is constant.

As described above, the first detection periods TS1 are arranged so as to overlap with the first drive periods TD1. That is to say, as illustrated in FIG. 11, the switch element 54A is in the ON state in the entire first drive period TD1 in which the first detection drive signal VD1 is supplied to the drive electrode Tx2.

In the first detection period TS1, the switch element 54A is in the ON state and the output signal Vo including the linear region and the saturation region is supplied to the A/D conversion circuit 76B of the detection circuit 76. The A/D conversion circuit 76B samples the output signal Vo at a predetermined cycle and outputs the first detection values S1.

With reference to FIG. 10 again, the resonance of the LC circuit 35 does not occur in the period in which the first detection drive signal VD1 is supplied to the drive electrode Tx3 superimposed with the finger Fg in the first detection period TS1. The detection electrode Rx4 outputs the detection signal Vdet in accordance with change in the mutual capacitance between the drive electrode Tx3 and the detection electrode Rx4 that is caused by contact or proximity of the finger Fg.

The resonance of the LC circuit 35 causes the amplitude of the detection signal Vdet that is output from the detection electrode Rx2 to be increased over time in the period in which the first detection drive signal VD1 is supplied to the drive electrode Tx5 superimposed with the second electrode 32 and the reference potential Vdc is supplied to the drive electrode Tx2 superimposed with the second electrode 32 in the first detection period TS1. The detection signal Vdet that is output from the detection electrode Rx2 and the output signal Vo and the first detection values S1 provided by the signal processing by the detection circuit 76 are similar to those in FIG. 11, and detailed explanation thereof is omitted.

Next, as illustrated in FIG. 10 and FIG. 12, the resonance of the LC circuit 35 does not occur in a period in which the second detection signal VD2 is supplied to the drive electrode Tx2 superimposed with the first electrode 31 in the second detection period TS2 and the second drive period TD2. The detection electrode Rx1 outputs the detection signal Vdet in accordance with change in the mutual capacitance between the drive electrode Tx2 and the detection electrode Rx1 that is caused by superimposition of the first electrode 31.

As illustrated in FIG. 12, the amplitude of the detection signal Vdet generated in the second detection period TS2 is smaller than the amplitude of the detection signal Vdet generated in the first detection period TS1 (refer to FIG. 11). The output signal Vo and the second detection values S2 provided by the signal processing by the detection circuit 76 in the second detection period TS2 also have smaller amplitudes (voltage values) than those of the output signal Vo and the second detection values S2 in the first detection period TS1.

As illustrated in FIGS. 11 and 12, the length of the first detection drive period TD1 corresponding to the first detection period TS1 and the first detection period TS1 is larger than the lengths of the second drive period TD2 corresponding to the second detection period TS2 and the second drive period TD2. The length of the first non-detection period NTD1 corresponding to the first non-detection period NTS1 and the first non-detection period NTS1 are smaller than the lengths of the second non-drive period NTD2 corresponding to the second non-detection period NTS2 and the second non-detection period NTS2. The total period of the first drive periods TD1 and the first non-drive periods NTD1 is equal to the total period of the second drive periods TD2 and the second non-drive periods NTD2.

To be more specific, one first drive period TD1 in which the drive electrode scan circuit 56 supplies the first detection drive signal VD1 to the drive electrode Tx is longer than one second drive period TD2 in which the drive electrode scan circuit 56 supplies the second detection drive signal VD2 to the drive electrode Tx. The first detection period TS1 in which the switch element 54A is in the ON state and the detection circuit 76 outputs the first detection values S1 in accordance with the first drive period TD1 is longer than the second detection period TS2 in which the switch element 54A is in the ON state and the detection circuit 76 outputs the second detection values S2 in accordance with the second drive period TD2.

The number of pulses of the first detection drive signal VD1 that is supplied to the drive electrode Tx in the first drive period TD1 is thereby larger than that in the second drive period TD2. The ratio of the saturation region in the output signal Vo in the first detection period TS1 can be made higher than that in the case where the first drive period TD1 is driven with the same length (number of pulses) as the second drive period TD2. In other words, a period of the saturation region in the output signal Vo in the first detection period TS1 can be made longer than that of the linear region and the ratio of the linear region in the detection signal Vdet can be relatively lowered by making the first drive period TD1 be longer than the second drive period TD2 in accordance with the period corresponding to the linear region (the period in which the amplitude of the detection signal Vdet changes by the resonance of the LC circuit 35).

The signal values of the first detection values S1 that are output from the detection circuit 76 are thereby mainly formed by the saturation region and are increased. On the other hand, in the second detection period TS2 and the second drive period TD2, resonance does not occur, so that the second detection values S2 do not change over time and the signal values thereof are not increased. As a result, the signal values Sd (S1-S2) as the differences illustrated in FIG. 8 are increased, and the input detection system 1 can improve the detection sensitivity of the input support device 3.

With reference to FIG. 10 again, the resonance of the LC circuit 35 does not occur in the period in which the second detection drive signal VD2 is supplied to the drive electrode Tx3 superimposed with the finger Fg in the second detection period TS2. The detection electrode Rx4 outputs the detection signal Vdet in accordance with change in the mutual capacitance between the drive electrode Tx3 and the detection electrode Rx4 that is caused by contact or proximity of the finger Fg.

The resonance of the LC circuit 35 does not occur in the period in which the second detection drive signal VD2 is supplied to the drive electrode Tx5 superimposed with the second electrode 32 in the second detection period TS2. The detection signal Vdet that is output from the detection electrode Rx2 and the output signal Vo and the second detection values S2 provided by the signal processing by the detection circuit 76 are similar to those in FIG. 12, and the second detection values S2 do not change over time.

Although the case in which the first detection periods TS1 and the first drive periods TD1 have the same length and the second detection periods TS2 and the second drive periods TD2 have the same length has been described, the lengths are not limited thereto. For example, such control may be performed that the first detection periods TS1 are ended and the switch elements are turned OFF after a predetermined period has elapsed since the first drive periods TD1 are ended (since the drive electrode scan circuit 56 finishes the supply of the first detection drive signal VD1). The first non-drive periods NTD1 and the first non-detection periods NTS1 may be respectively arranged after the first drive periods TD1 and the first detection periods TS1. The second non-drive periods NTD2 and the second non-detection periods NTS2 may be respectively arranged after the second drive periods TD2 and the second detection periods TS2.

As described above, the input detection system 1 in the present embodiment includes the display device 2 (the display device with the detection function) including the pixels PX (sub pixels SPX), the drive electrodes Tx, and the detection electrodes Rx arrayed in the display region DA, the input support device 3 including the LC circuit 35, the first electrode 31 coupled to one end side of the LC circuit 35, and the second electrode 32 coupled to the other end side of the LC circuit 35, and the drive electrode scan circuit 56 configured to supply the drive signals (the first detection drive signal VD1 and the second detection drive signal VD2) to the drive electrodes Tx. The display device 2 (the display device with the detection function) executes the first display periods, the first detection periods TS1, the second display periods, and the second detection periods TS2 in the time division manner. The first drive periods TD1 that correspond to the first detection periods TS1 and in which the drive electrode scan circuit 56 supplies the first detection drive signal VD1 to the drive electrodes Tx and the second drive periods TD2 that correspond to the second detection periods TS2 and in which the drive electrode scan circuit 56 supplies the second detection drive signal VD2 to the drive electrodes Tx are provided. The first drive periods TD1 are longer than the second drive periods TD2.

Second Embodiment

Figure 13:
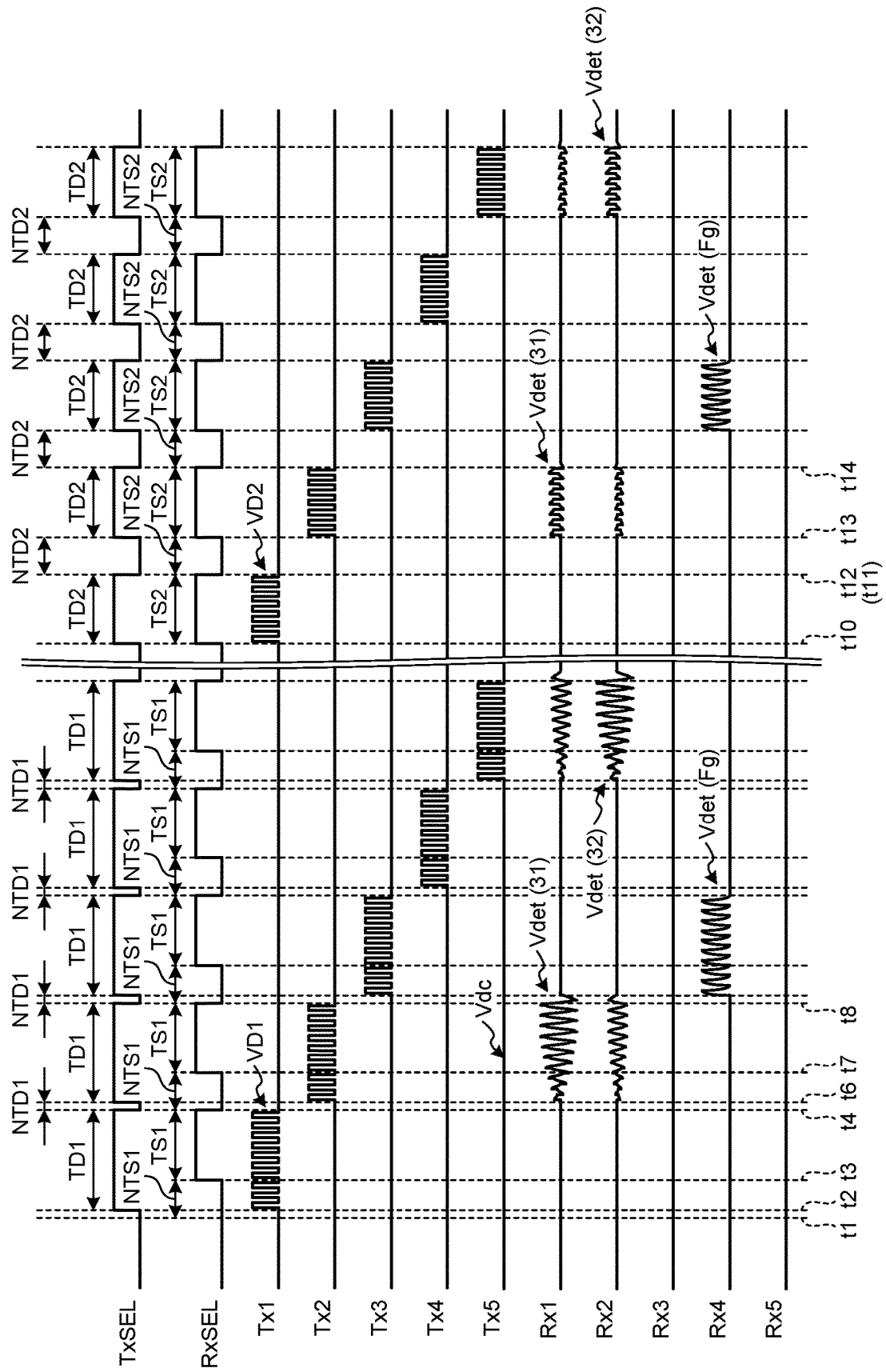
FIG. 13 is a timing waveform chart for explaining first detection periods and second detection periods of an input detection system according to a second embodiment.
Figure 14:
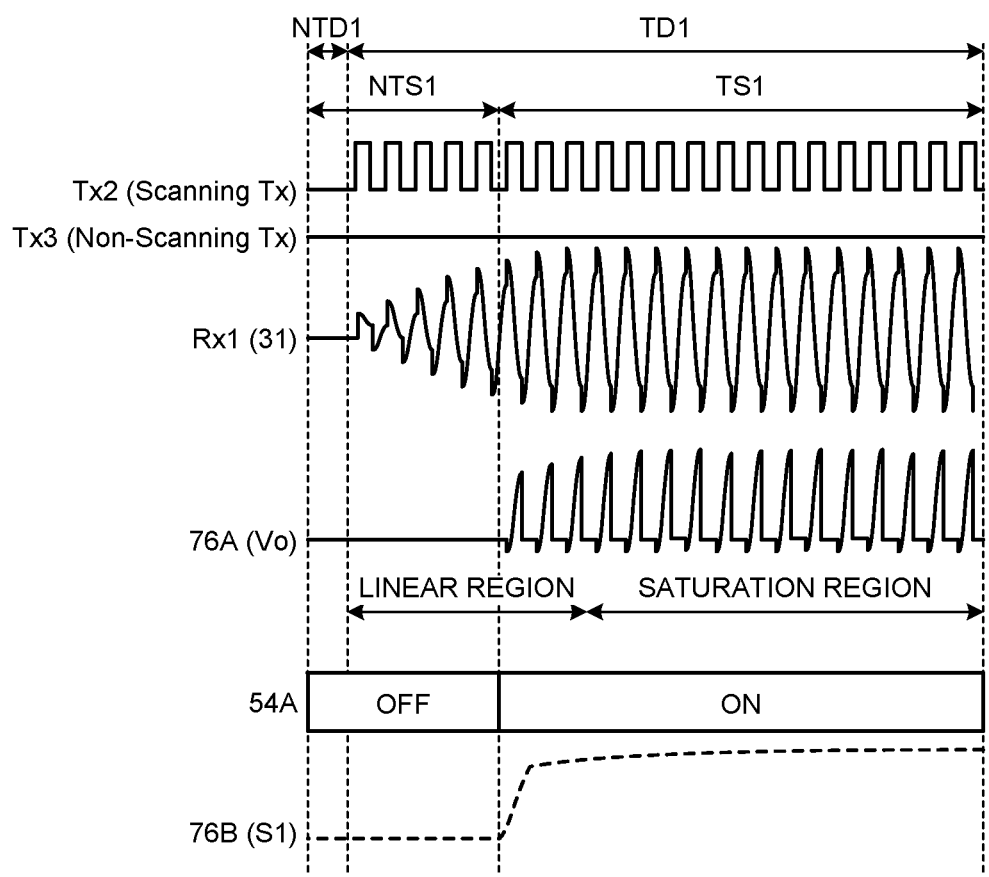
FIG. 14 is a timing waveform chart for explaining the first detection period of the input detection system in the second embodiment.

FIG. 13 is a timing waveform chart for explaining first detection periods and second detection periods of an input detection system according to a second embodiment. FIG. 14 is a timing waveform chart for explaining the first detection period of the input detection system in the second embodiment. In the following explanation, the same reference numerals denote the same components described in the above-mentioned embodiment and repeated explanation thereof is omitted.

As illustrated in FIGS. 13 and 14, as for one first detection period TS1, the first drive period TD1 is longer than the first detection period TS1, and the start timing of the first drive period TD1 is earlier than the start timing of the first detection period TS1. The first non-drive period NTD1 is shorter than the first non-detection period NTS1. A part of the first drive period TD1 overlaps with the first non-detection period NTS1.

To be more specific, as illustrated in FIG. 14, the drive electrode scan circuit 56 starts supply of the first detection drive signal VD1 in the first drive period TD1. As in the first embodiment, resonance of the LC circuit 35 causes the amplitude of the detection signal Vdet that is output from the detection electrode Rx1 to be increased over time. A predetermined period after the first drive period TD1 is started overlaps with the first non-detection period NTS1. The switch element 54A is in the OFF state and the output signal Vo is not output from the detector 76A to the A/D conversion circuit 76B in a period corresponding to the linear region of the output signal Vo (first non-detection period NTS1). That is to say, in a period where the first drive period TD1 is started and that overlaps with the first non-detection period NTS1, the first detection drive signal VD1 is supplied to the drive electrode Tx2 but no first detection value S1 is output from the detection circuit 76.

Then, after a predetermined period has elapsed since the start of the first drive period TD1, the first detection period TS1 is started. After the predetermined period has elapsed, the amplitude of the detection signal Vdet that is output from the detection electrode Rx1 becomes larger toward the saturation region or reaches the saturation region by the resonance of the LC circuit 35. When the switch element 54A is turned ON (first detection period TS1) at this time, the output signal Vo is output to the A/D conversion circuit 76B. The A/D conversion circuit 76B outputs the first detection values S1 based on the output signal Vo corresponding to the saturation region.

The second drive periods TD2 and the second detection periods TS2 are similar to those in the first embodiment illustrated in FIG. 10 and FIG. 12, and repeated explanation thereof is omitted. As illustrated in FIG. 12 and FIG. 14, the length of one first detection period TS1 (FIG. 14) is equal to the length of one second detection period TS2 (FIG. 12). That is to say, ON/OFF control of the switch element 54A can be made common between the first detection period TS1 and the second detection period TS2. The lengths are however not limited thereto, and the length of one first detection period TS1 (FIG. 14) may be different from the length of one second detection period TS2 (FIG. 12).

In the second embodiment, each first drive period TD1 is longer than each second drive period TD2 as in the first embodiment. The switch element 54A is in the OFF state and no first detection value S1 is output from the detection circuit 76 in the period corresponding to the linear region of the output signal Vo. That is to say, the resonance phenomenon is preliminarily generated prior to the first detection period TS1 by setting the first drive period TD1 to be longer than the first detection period TS1 and making the start of the first drive period TD1 be earlier than the start of the first detection period TS1, thereby completing generation of the linear region that is unnecessary for the above-mentioned calculation processing before the first detection period TS in which the output signal Vo is formed substantially. The first detection values S1 can therefore be defined based on the output signal Vo in which the ratio of the saturation region is high or that is substantially formed only by the saturation region. Accordingly, the first detection values S1 can be increased, and the calculation processing in the detection circuit 76 and the first calculation circuit 71 (FIG. 6) and the like at the subsequent stages can be reduced.

Third Embodiment

Figure 15:
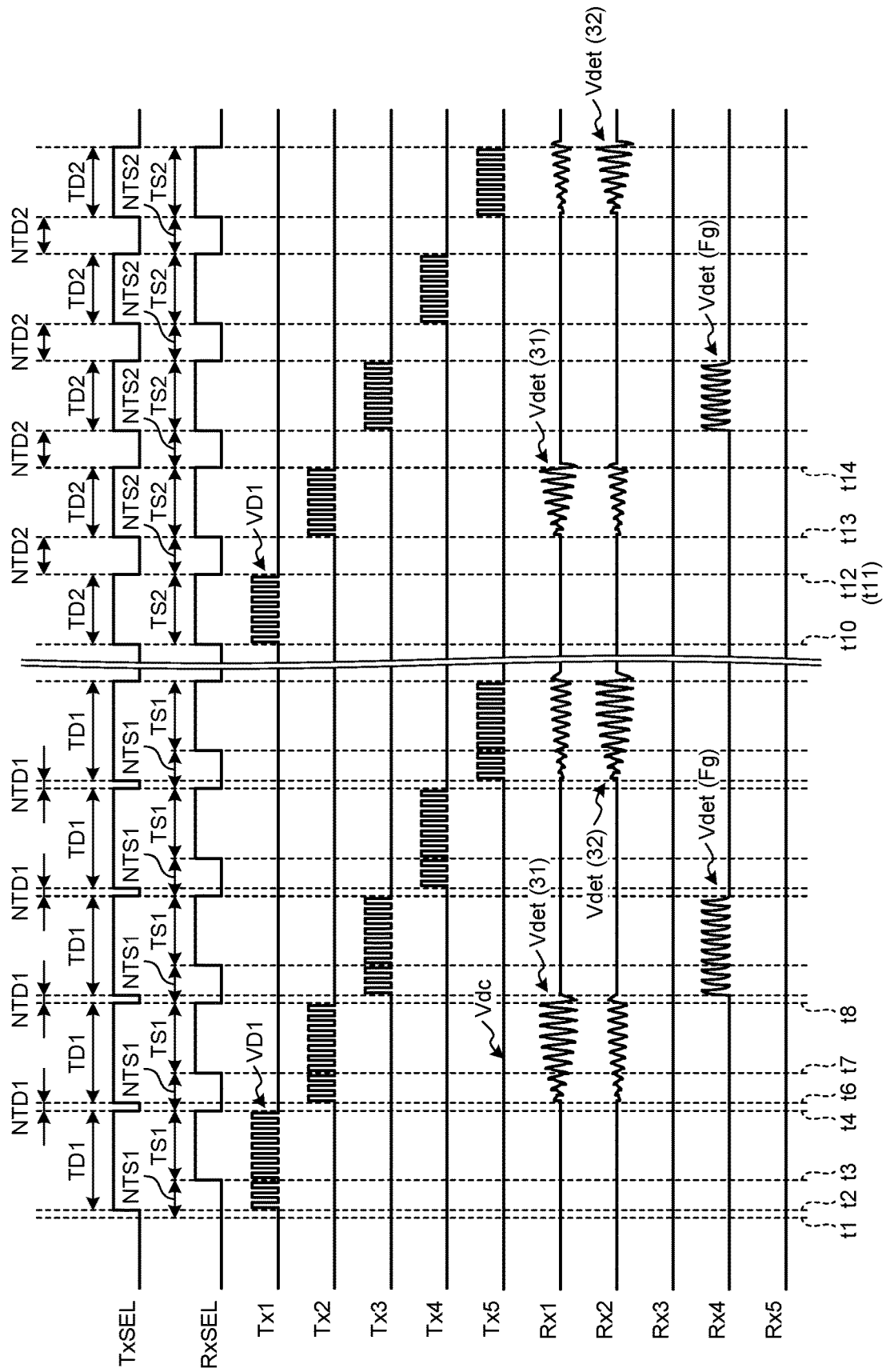
FIG. 15 is a timing waveform chart for explaining first detection periods and second detection periods of an input detection system according to a third embodiment.
Figure 16:
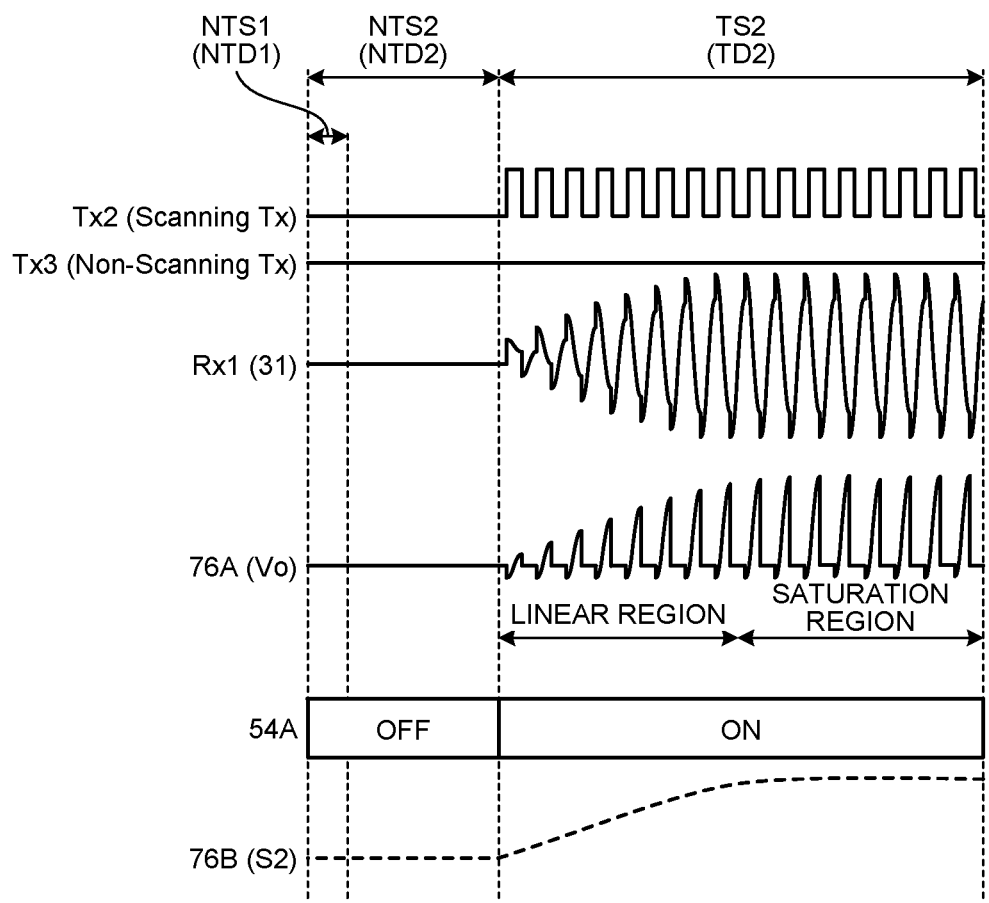
FIG. 16 is a timing waveform chart for explaining the second detection period of the input detection system in the third embodiment.

FIG. 15 is a timing waveform chart for explaining first detection periods and second detection periods of an input detection system according to a third embodiment. FIG. 16 is a timing waveform chart for explaining the second detection period of the input detection system in the third embodiment.

As illustrated in FIG. 15, in the input detection system 1 in the third embodiment, the drive electrode scan circuit 56 supplies the first detection drive signal VD1 having the resonant frequency of the LC circuit 35 to the drive electrodes Tx in the first drive periods TD1 and the second drive periods TD2. In the third embodiment, an arrangement relation of the first drive periods TD1, the first detection periods TS1, the second drive periods TD2 and the second detection periods TS2 is similar to that in the second embodiment. The respective waveforms of the first drive periods TD1 and the first detection periods TS1 in the third embodiment are similar to those in the second embodiment (FIG. 14), and repeated explanation thereof is omitted.

As illustrated in FIG. 15, resonance of the LC circuit 35 causes the amplitude of the detection signal Vdet that is output from the detection electrode Rx1 to be increased over time in a period in which the first detection drive signal VD1 is supplied to the drive electrode Tx2 superimposed with the first electrode 31 and the reference potential Vdc is supplied to the drive electrode Tx5 superimposed with the second electrode 32 in the second detection period TS2 and the second drive period TD2.

As illustrated in FIG. 15 and FIG. 16, the output signal Vo that is output by the detector 76A of the detection circuit 76 has a linear region where the amplitude increases linearly and a saturation region where the amplitude is constant in the second detection period TS2. On the other hand, each first drive period TD1 is longer than each second drive period TD2. The start timing of the first drive period TD1 is earlier than the start timing of the first detection period TS1, and the start timing of the second drive period TD2 is equal to the start timing of the second detection period TS2.

As illustrated in FIG. 16, the output signal Vo and the second detection values S2 provided by the signal processing by the detection circuit 76 therefore include the start of the linear region to the saturation region in the second detection period TS2. On the other hand, the output signal Vo and the first detection values S1 provided by the signal processing by the detection circuit 76 correspond to the saturation region and do not include most of the linear region in the first detection period TS1 (refer to FIG. 14).

That is to say, the ratio of the saturation region in the second detection values S2 that are output from the detection circuit 76 in the second detection period TS2 is lower than the ratio of the saturation region in the first detection values S1 that are output from the detection circuit 76 in the first detection period TS1. As a result, even when driven with the first detection drive signal VD1 having the same resonant frequency in the first drive period TD1 and the second drive period TD2, the detection circuit 76 outputs the first detection values S1 and the second detection values S2 being different values by making the lengths of the first drive period TD1 and the second drive period TD2 different from each other. The input detection system 1 in the third embodiment can therefore detect the input support device 3 based on the signal values Sd (S1-S2) as the above-mentioned differences.

Fourth Embodiment

Figure 17:
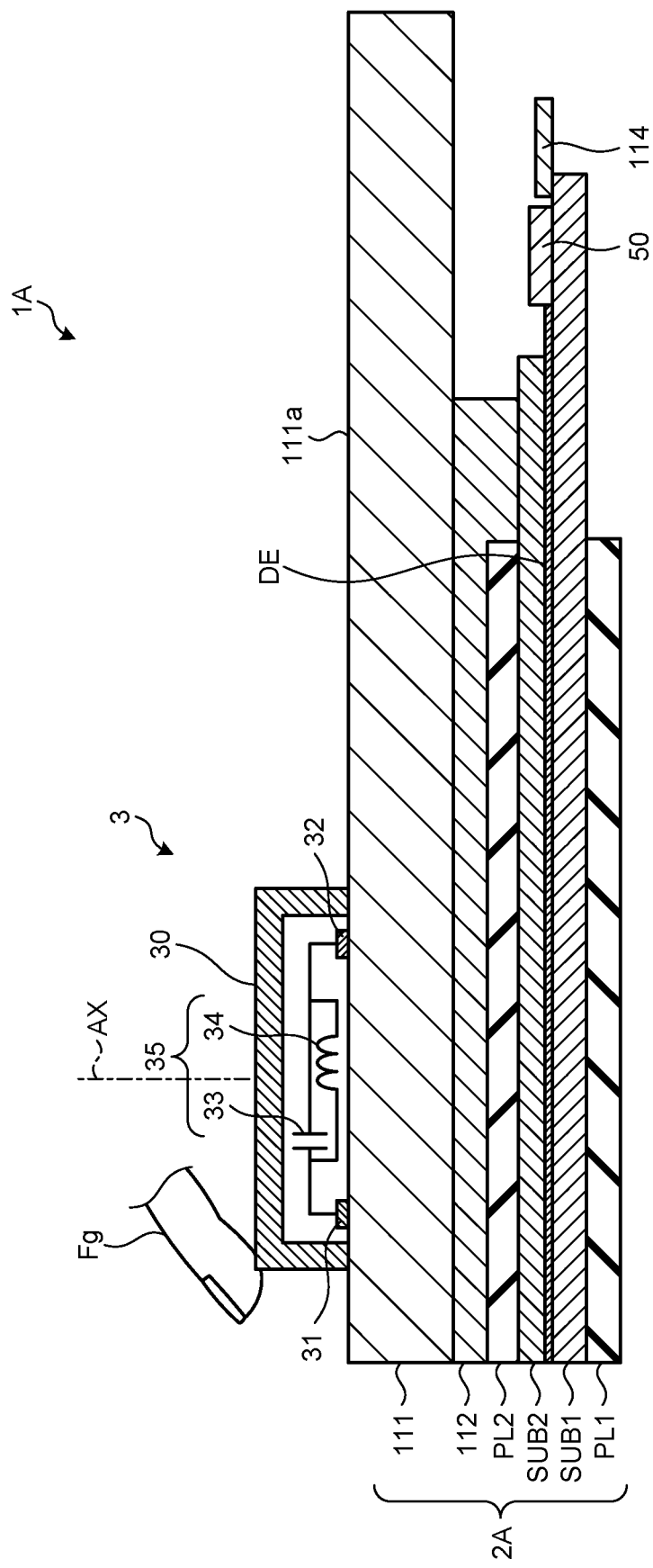
FIG. 17 is a cross-sectional view illustrating the schematic cross-sectional configuration of an input detection system according to a fourth embodiment.

FIG. 17 is a cross-sectional view illustrating the schematic cross-sectional configuration of an input detection system according to a fourth embodiment. The above-mentioned first embodiment to third embodiment have explained the examples in which the input support device 3 is arranged above the display device 2 including the mutual electrostatic capacitance-type touch sensor with the drive electrodes Tx and the detection electrodes Rx. The configuration is however not limited thereto. The touch sensor (display device 2) may be of a self-electrostatic capacitance type (self-type).

As illustrated in FIG. 17, a display device 2A includes a plurality of detection electrodes DE provided above the array substrate SUB1 in an input detection system 1A in the fourth embodiment. The detection electrodes DE serve as both of common electrodes in display and the drive electrodes Tx and the detection electrodes Rx for detecting a detection target such as the input support device 3 and the finger Fg. In the fourth embodiment, the detection electrodes Rx, the detection IC 51, and the wiring substrate 115 (refer to FIG. 2) are not provided on the counter substrate SUB2 unlike the first embodiment to the third embodiment.

Figure 18:
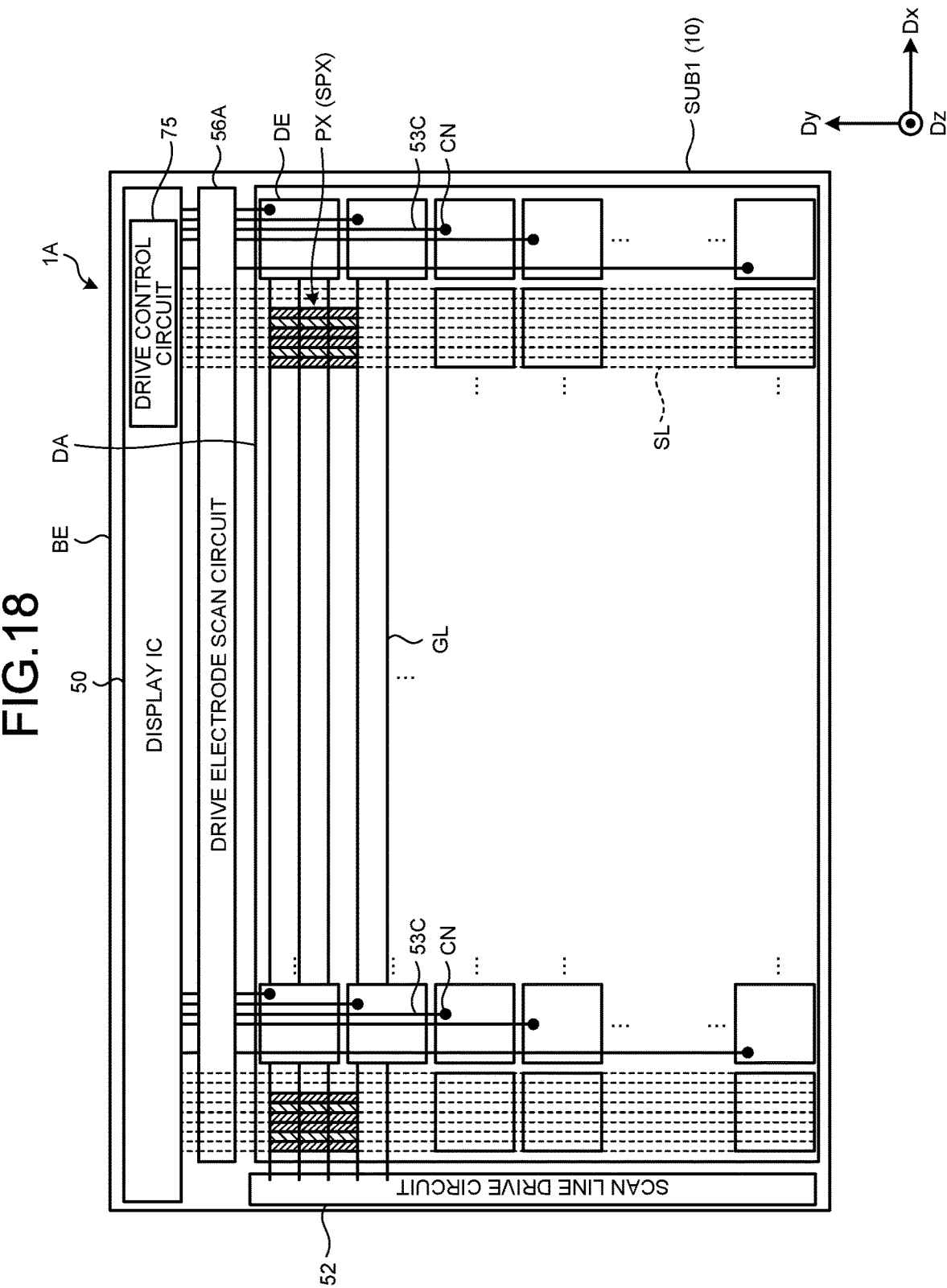
FIG. 18 is a plan view schematically illustrating an array substrate of the input detection system in the fourth embodiment.

FIG. 18 is a plan view schematically illustrating the array substrate of the input detection system in the fourth embodiment. As illustrated in FIG. 18, the detection electrodes DE are arrayed in a matrix with a row-column configuration in the display region DA of the array substrate SUB1. Wiring lines 53C are provided so as to correspond to the respective detection electrodes DE and are coupled to the detection electrodes DE through contact holes CN. Each of the wiring lines 53C extends along the second direction Dy and they are aligned in the first direction Dx. The wiring lines 53C are coupled to a drive electrode scan circuit 56A and the display IC 50 provided in the peripheral region BE. The pixel signal lines SL are coupled to the display IC 50 provided in the peripheral region BE.

In the present embodiment, the display IC 50 has the functions of the circuits included in the detection IC 51 illustrated in FIG. 6. The configuration is however not limited thereto, and the detection IC 51 may be provided separately from the display IC 50 as in the first embodiment.

The drive electrode scan circuit 56A supplies the display drive signal VCOM to the detection electrodes DE simultaneously in display periods. The drive electrode scan circuit 56A supplies the detection drive signal VD to at least equal to or more than one of the detection electrodes DE in detection periods. The detection electrodes DE output the detection signals Vdet based on changes in the self-electrostatic capacitances to the detection circuit 76 (refer to FIG. 6) that the display IC 50 includes. The display IC 50 thereby detects the finger Fg or the input support device 3.

More specifically, in touch detection where the input support device 3, the finger Fg, or the like is detected, the display IC 50 and the drive electrode scan circuit 56A supply the detection drive signals VD (the first detection drive signal VD1 and the second detection drive signal VD2) to the detection electrodes DE in order. That is to say, the display IC 50 and the drive electrode scan circuit 56A supply the detection drive signals VD to at least equal to or more than one of the detection electrodes DE and supply the reference potential Vdc to the other detection electrodes DE. The drive electrode scan circuit 56A may scan the detection electrodes DE to be driven in order one by one or may scan the detection electrodes DE in order row by row or column by column. The display IC 50 can detect the position and the like of the input support device 3 utilizing the changes in the self-capacitances of the detection electrodes DE and resonance of the LC circuit 35 of the input support device 3. The drive method (the first detection periods TS1, the first drive periods TD1, the second detection periods TS2, and the second drive periods TD2) in any of the above-mentioned first embodiment to third embodiment can be employed also in the present embodiment.

Fifth Embodiment

Figure 19:
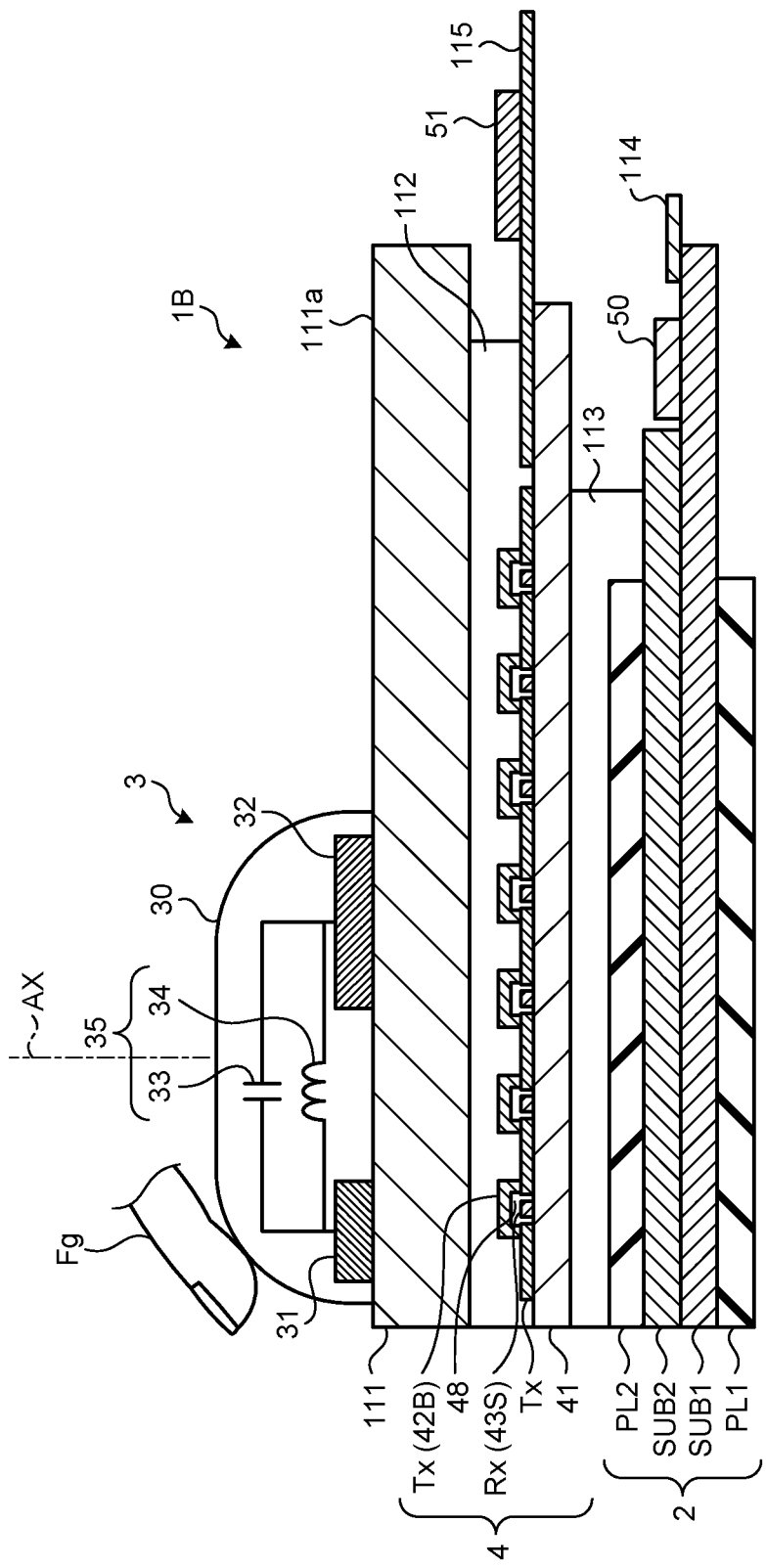
FIG. 19 is a cross-sectional view illustrating the schematic cross-sectional configuration of an input detection system according to a fifth embodiment.

FIG. 19 is a cross-sectional view illustrating the schematic cross-sectional configuration of an input detection system according to a fifth embodiment. As illustrated in FIG. 19, an input detection system 1B in the fifth embodiment includes the display device 2 and a detection device 4. The detection device 4 is a so-called touch panel mounted on the display device 2. The detection device 4 is a mutual electrostatic capacitance-type touch panel including the drive electrodes Tx and the detection electrodes Rx. The detection device 4 is however not limited thereto, and the detection device 4 may be a self-electrostatic capacitance-type touch panel with a plurality of detection electrodes arrayed in a matrix with a row-column configuration. The drive electrodes Tx and the detection electrodes Rx are not provided in the display device 2.

The detection device 4 is bonded onto the display device 2 through an adhesive layer 113. The detection device 4 includes a substrate 41, the drive electrodes Tx, the detection electrodes Rx, and an insulating film 48. FIG. 19 illustrates parts (coupling portions 43S) of the detection electrodes Rx. The drive electrodes Tx and the detection electrodes Rx are provided above the substrate 41. Bridge portions 42B of the drive electrodes Tx and the coupling portions 43S of the detection electrodes Rx are insulated from each other by the insulating film 48. Mutual electrostatic capacitances are formed between the drive electrodes Tx and the detection electrodes Rx.

The wiring substrate 115 is coupled to the substrate 41. The wiring substrate 115 is configured by a flexible wiring substrate, for example. The detection IC 51 is mounted on the wiring substrate 115.

The cover member 111 is bonded onto the detection device 4 through the adhesive layer 112. For example, a glass substrate or a resin substrate is used for the cover member 111.

Figure 20:
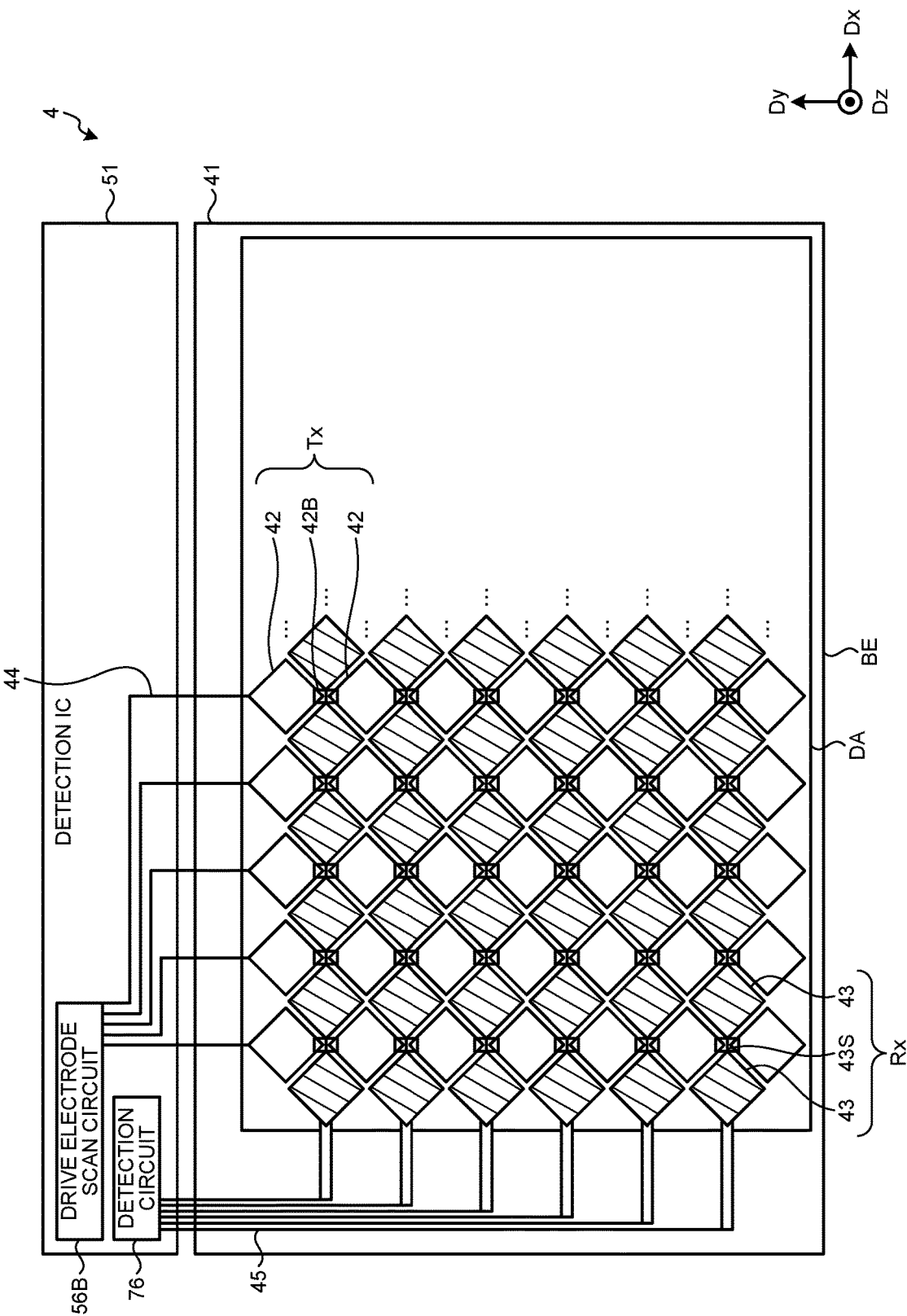
FIG. 20 is a plan view schematically illustrating a detection device included in the input detection system in the fifth embodiment.

FIG. 20 is a plan view schematically illustrating the detection device included in the input detection system in the fifth embodiment. In FIG. 20, electrode portions 43 of the detection electrodes Rx are hatched in order to make the drawing easy to view. As illustrated in FIG. 20, the drive electrodes Tx and the detection electrodes Rx are provided in a detection region (a region overlapping with the display region DA) of the substrate 41. The drive electrodes Tx and the detection electrodes Rx are made of, for example, a conductive material having a light transmitting property, such as indium tin oxide (ITO) and indium zinc oxide (IZO).

The drive electrodes Tx include a plurality of electrode portions 42 and the bridge portions 42B. In one drive electrode Tx, the electrode portions 42 are aligned in the second direction Dy. The bridge portion 42B couples the electrode portions 42 adjacent to each other in the second direction Dy. One drive electrode Tx thereby extends in the second direction Dy. The drive electrodes Tx are aligned in the first direction Dx. Each of the drive electrodes Tx is coupled to the detection IC 51 through a coupling wiring line 44.

The detection electrodes Rx include the electrode portions 43 and the coupling portions 43S. In one detection electrode Rx, the electrode portions 43 are aligned in the first direction Dx. The coupling portion 43S couples the electrode portions 43 adjacent to each other in the first direction Dx. One detection electrode Rx thereby extends in the first direction Dx. The detection electrodes Rx are aligned in the second direction Dy. Each of the detection electrodes Rx is coupled to the detection IC 51 through a coupling wiring line 45. In the present embodiment, the electrode portions 43 of the detection electrodes Rx are provided in the same layer as the electrode portions 42 of the drive electrodes Tx. The bridge portions 42B are provided in a different layer from the coupling portions 43S with the insulating film 48 (refer to FIG. 19) interposed therebetween and intersect with the coupling portions 43S in a plan view.

Each of the electrode portions 42 of the drive electrodes Tx and the electrode portions 43 of the detection electrodes Rx has a square (rhombic) shape. The shapes of the electrode portions 42 and 43 are not however limited thereto, and each of the electrode portions 42 and 43 may have another shape such as a polygonal shape, a circular shape, or the like.

The detection IC 51 includes the detection circuit 76 and a drive electrode scan circuit 56B. The drive electrode scan circuit 56B supplies the detection drive signals VD (the first detection drive signal VD1 and the second detection drive signal VD2) to each of the drive electrodes Tx. The detection electrodes Rx output the detection signals Vdet based on changes in the mutual electrostatic capacitances Cm when the detection drive signals VD are supplied thereto. The detection circuit 76 can detect the detection target based on the detection signals Vdet that are output in accordance with the changes in the mutual electrostatic capacitances Cm between the drive electrodes Tx and the detection electrodes Rx.

The drive method (the first detection periods TS1, the first drive periods TD1, the second detection periods TS2, and the second drive periods TD2) in any of the above-mentioned first embodiment to third embodiment can be employed also in the present embodiment. In the input detection system 1B in the present embodiment, the detection device 4 is provided above the display device 2, and restrictions on the detection device 4 due to the display periods of the display device 2 are reduced. That is to say, the input detection system 1B in the present embodiment can improve the degree of freedom in driving of the detection device 4 in comparison with the above-mentioned first embodiment to third embodiment.

Figure 21:
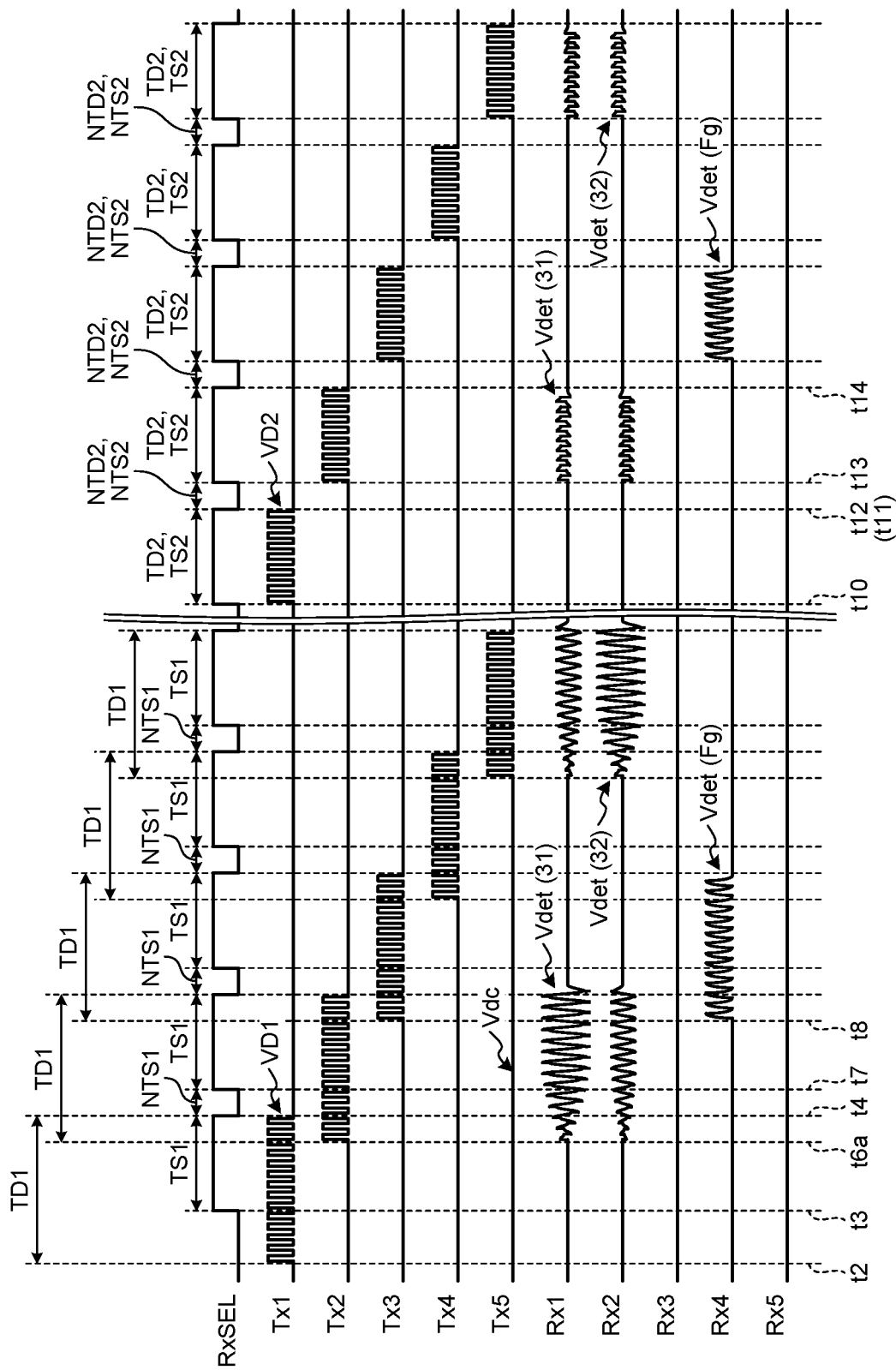
FIG. 21 is a timing waveform chart for explaining first detection periods and second detection periods of the input detection system in the fifth embodiment.

FIG. 21 is a timing waveform chart for explaining the first detection periods and the second detection periods of the input detection system in the fifth embodiment. As illustrated in FIG. 21, as in the second embodiment, as for one first detection period TS1, the first drive period TD1 is longer than the first detection period TS1, and the start timing of the first drive period TD1 is earlier than the start timing of the first detection period TS1 in the input detection system 1B in the fifth embodiment. The present embodiment is however different in that parts of the adjacent first drive periods TD1 are superimposed.

To be more specific, among the drive electrodes Tx, a part of the first drive period TD1 in which the drive electrode scan circuit 56B supplies the first detection drive signal VD1 to the drive electrode Tx1 (first drive electrode) and a part of the first drive period TD1 in which the drive electrode scan circuit 56B supplies the first detection drive signal VD1 to the drive electrode Tx2 (second drive electrode) subsequent to the drive electrode Tx1 (first drive electrode) overlap with each other in the first detection periods TS1.

In the example illustrated in FIG. 21, the supply of the first detection drive signal VD1 to the drive electrode Tx1 (first drive electrode) is started at time t2, and the supply of the first detection drive signal VD1 to the drive electrode Tx1 (first drive electrode) is ended at time t4. The supply of the first detection drive signal VD1 to the drive electrode Tx2 (second drive electrode) is started at time t6a between time t2 and time t4. That is to say, the first detection drive signal VD1 is supplied to the drive electrode Tx1 and the first detection drive signal VD1 is not supplied to the drive electrode Tx2 in a period between time t2 and time t6a. The first detection drive signal VD1 is supplied to the drive electrode Tx1 and the drive electrode Tx2 in a period between time t6a and time t4. The first detection drive signal VD1 is not supplied to the drive electrode Tx1 and the first detection drive signal VD1 is supplied to the drive electrode Tx2 in a period between time t4 and time t8.

Subsequently, a part of the first drive period TD1 in which the drive electrode scan circuit 56B supplies the first detection drive signal VD1 to the drive electrode Tx2 (second drive electrode) and a part of the first drive period TD1 in which the drive electrode scan circuit 56B supplies the first detection drive signal VD1 to the drive electrode Tx3 subsequent to the drive electrode Tx2 are arranged so as to overlap with each other, similarly.

In the second detection periods TS2, the lengths of the second detection periods TS2 and the second drive periods TD2 are the same as in the above-mentioned first embodiment to third embodiment. The second non-drive period NTD2 is provided between the adjacent second drive periods TD2. That is to say, the second non-drive period NTD2 in which the second detection drive signal VD2 is not supplied is provided between the second drive period TD2 in which the drive electrode scan circuit 56 supplies the second detection drive signal VD2 to the drive electrode Tx1 (first drive electrode) and the second drive period TD2 in which the drive electrode scan circuit 56 supplies the second detection drive signal VD2 to the drive electrode Tx2 (second drive electrode).

As described above, in the input detection system 1B in the present embodiment, parts of the first drive periods TD1 overlap with each other for execution for each of the drive electrodes Tx, thereby increasing the ratio of the saturation regions in the detection signals Vdet generated by the resonance of the LC circuit 35. As a result, the first detection values S1 that are output from the detection circuit 76 can be increased.

With the driving method illustrated in FIG. 21, as a period in which parts of the first drive periods TD1 overlap with each other is shorter, positional accuracy of detection of the detection target can be improved. Since the amplitudes of the detection signals Vdet in the linear regions are smaller than the amplitudes of the detection signals Vdet in the saturation regions, detection accuracy can be prevented from being lowered even if parts of the first drive periods TD1 overlap with each other.

Although the preferred embodiments of the present invention have been described above, the present invention is not limited by these embodiments. Contents disclosed in the embodiments are merely examples, and various modifications can be made in a scope without departing from the gist of the present invention. Appropriate modifications in a scope without departing from the gist of the present invention naturally belong to the technical scope of the present invention. At least one of various omission, replacement, and modification of the components can be performed in a scope without departing from the gist of the embodiments and modifications described above.

What is claimed is:

1. An input detection system comprising:
a display device with a detection function including a plurality of pixels, a plurality of drive electrodes, and a plurality of detection electrodes arrayed in a display region;
an input device including an inductor-capacitor (LC) circuit, a first electrode coupled to one end side of the LC circuit, and a second electrode coupled to the other end side of the LC circuit; and
a drive electrode scan circuit configured to supply a drive signal to the drive electrodes, wherein
the display device with the detection function executes a plurality of first display periods, a plurality of first detection periods, a plurality of second display periods, and a plurality of second detection periods in a time division manner,
first drive periods correspond to the first detection periods and in which the drive electrode scan circuit supplies the drive signal to the drive electrodes,
second drive periods correspond to the second detection periods and in which the drive electrode scan circuit supplies the drive signal to the drive electrodes,
the first drive periods are longer than the second drive periods,
first non-drive periods are periods between the first display periods and the first drive periods and in which the drive electrode scan circuit does not supply the drive signal to the drive electrodes,
second non-drive periods are periods between the second display periods and the second drive periods and in which the drive electrode scan circuit does not supply the drive signal to the drive electrodes,
the first non-drive periods are shorter than the second non-drive periods, and
a total period of the first drive periods and the first non-drive periods is equal to a total period of the second drive periods and the second non-drive periods.

2. The input detection system according to claim 1, wherein periods until supply of the drive signal is started in the first drive periods after the first display periods are shorter than periods until supply of the drive signal is started in the second drive periods after the second display periods.

3. The input detection system according to claim 1, including a detection circuit to which detection signals are supplied from the detection electrodes, wherein
the first detection periods are periods in which the detection circuit outputs first detection values based on the detection signals supplied in the first drive periods, and the second detection periods are periods in which the detection circuit outputs second detection values based on the detection signals supplied in the second drive periods.

4. The input detection system according to claim 3, wherein as for one of the first detection periods, the first drive period is longer than the first detection period, and start timing of the first drive period is earlier than start timing of the first detection period.

5. The input detection system according to claim 4, wherein
first non-detection periods are periods between the first display periods and the first detection periods and in which the detection circuit outputs no first detection value,
second non-detection periods that are periods between the second display periods and the second detection periods and in which the detection circuit outputs no second detection value, and
the first non-detection periods overlap with parts of the first drive periods.

6. The input detection system according to claim 3, wherein
lengths of the first drive periods are the same as lengths of the first detection periods,
lengths of the second drive periods are the same as lengths of the second detection periods, and
the first detection periods are longer than the second detection periods.

7. The input detection system according to claim 1, wherein the drive electrode scan circuit supplies a first drive signal having a resonant frequency of the LC circuit to the drive electrodes in the first detection periods and supplies a second drive signal having a frequency different from the resonant frequency to the drive electrodes in the second detection periods.

8. The input detection system according to claim 1, wherein the drive electrode scan circuit supplies a first drive signal having a resonant frequency of the LC circuit to the drive electrodes in the first detection periods and the second detection periods.

9. A detection device in which an input device including an inductor-capacitor (LC) circuit and a first electrode and a second electrode coupled to the LC circuit is arranged in a detection region, the detection device comprising:
a plurality of drive electrodes and a plurality of detection electrodes arrayed in the detection region; and
a drive electrode scan circuit configured to supply a drive signal to the drive electrodes, wherein
a plurality of first detection periods and a plurality of second detection periods are executed in a time division manner,
first drive periods correspond to the first detection periods and in which the drive electrode scan circuit supplies the drive signal to the drive electrodes,
second drive periods correspond to the second detection periods and in which the drive electrode scan circuit supplies the drive signal to the drive electrodes are provided,
a first non-drive period is a period before one of the first drive periods and in which the drive electrode scan circuit does not supply the drive signal to the drive electrodes,
a second non-drive period is a period before one of the second drive periods and in which the drive electrode scan circuit does not supply the drive signal to the drive electrodes,
the first drive periods are longer than the second drive periods,
the first non-drive period is shorter than the second non-drive period, and
a total period of the first non-drive period and the one of the first drive periods is equal to a total period of the second non-drive period and the one of the second drive periods.

* * * * *